United States Patent
Sheppard et al.

(10) Patent No.: US 11,927,304 B2
(45) Date of Patent: Mar. 12, 2024

(54) AGRICULTURAL IMPLEMENT FRAME ASSEMBLY

(71) Applicant: Morris Industries Ltd., Saskatoon (CA)

(72) Inventors: Clint W. Sheppard, Yorkton (CA); Jeffrey Jonathan Gordon, Yorkton (CA)

(73) Assignee: Morris Equipment Ltd. (CA)

( * ) Notice: Subject to any disclaimer, the term of this patent is extended or adjusted under 35 U.S.C. 154(b) by 1173 days.

(21) Appl. No.: 16/271,477

(22) Filed: Feb. 8, 2019

(65) Prior Publication Data

US 2019/0246546 A1 Aug. 15, 2019

Related U.S. Application Data

(60) Provisional application No. 62/628,549, filed on Feb. 9, 2018, provisional application No. 62/628,558, filed on Feb. 9, 2018.

(51) Int. Cl.
| | |
|---|---|
| *F16M 11/00* | (2006.01) |
| *A01B 51/04* | (2006.01) |
| *A01C 7/06* | (2006.01) |
| *A01C 7/08* | (2006.01) |
| *F16B 2/06* | (2006.01) |
| *F16B 2/14* | (2006.01) |
| *F16B 7/00* | (2006.01) |
| *F16B 7/04* | (2006.01) |

(Continued)

(52) U.S. Cl.
CPC ............... *F16M 3/00* (2013.01); *A01B 51/04* (2013.01); *A01C 7/06* (2013.01); *A01C 7/08* (2013.01); *F16B 2/065* (2013.01); *F16B 2/14* (2013.01); *F16B 7/00* (2013.01); *F16B 7/044* (2013.01); *A01B 61/04* (2013.01)

(58) Field of Classification Search
CPC .. A01B 51/04; A01C 7/06; A01C 7/08; F16B 2/065; F16B 2/14; F16B 7/00; F16B 7/044; F16M 3/00
See application file for complete search history.

(56) References Cited

U.S. PATENT DOCUMENTS 5,961,243 A * 10/1999 Michaluk, III ........ A47B 47/00
403/256
6,016,877 A * 1/2000 Noonan ................. B23K 33/00
172/776

(Continued)

*Primary Examiner* — Amy J. Sterling
(74) *Attorney, Agent, or Firm* — Hovey Williams LLP

(57) ABSTRACT

An agricultural implement is configured to be advanced in a forward direction and includes an implement frame. The implement frame includes a pair of laterally extending fore-and-aft spaced frame members. The frame also includes a fore-and-aft extending interconnecting member that extends between the frame members and presents forward and aft ends. At least one of the frame members comprises a tubular beam presenting forward and aft walls. The forward and aft walls at least partly define an interior beam space, with a window opening being defined in a first one of the walls. The tubular beam receives a respective end of the interconnecting member so that the interconnecting member extends into and out of the interior beam space through the window opening. The respective end of the interconnecting member is welded to a second one of the walls.

19 Claims, 25 Drawing Sheets

(51) Int. Cl.
*F16M 3/00* (2006.01)
*A01B 61/04* (2006.01)

(56) References Cited

U.S. PATENT DOCUMENTS

| | | | | |
|---|---|---|---|---|
| 6,732,812 B1* | 5/2004 | Royer | ................. | A01B 51/04 |
| | | | | 172/776 |
| 9,072,215 B2* | 7/2015 | Palen | ................. | A01B 76/00 |
| 2001/0000119 A1* | 4/2001 | Jaekel | ................. | B62D 23/005 |
| | | | | 296/205 |

* cited by examiner

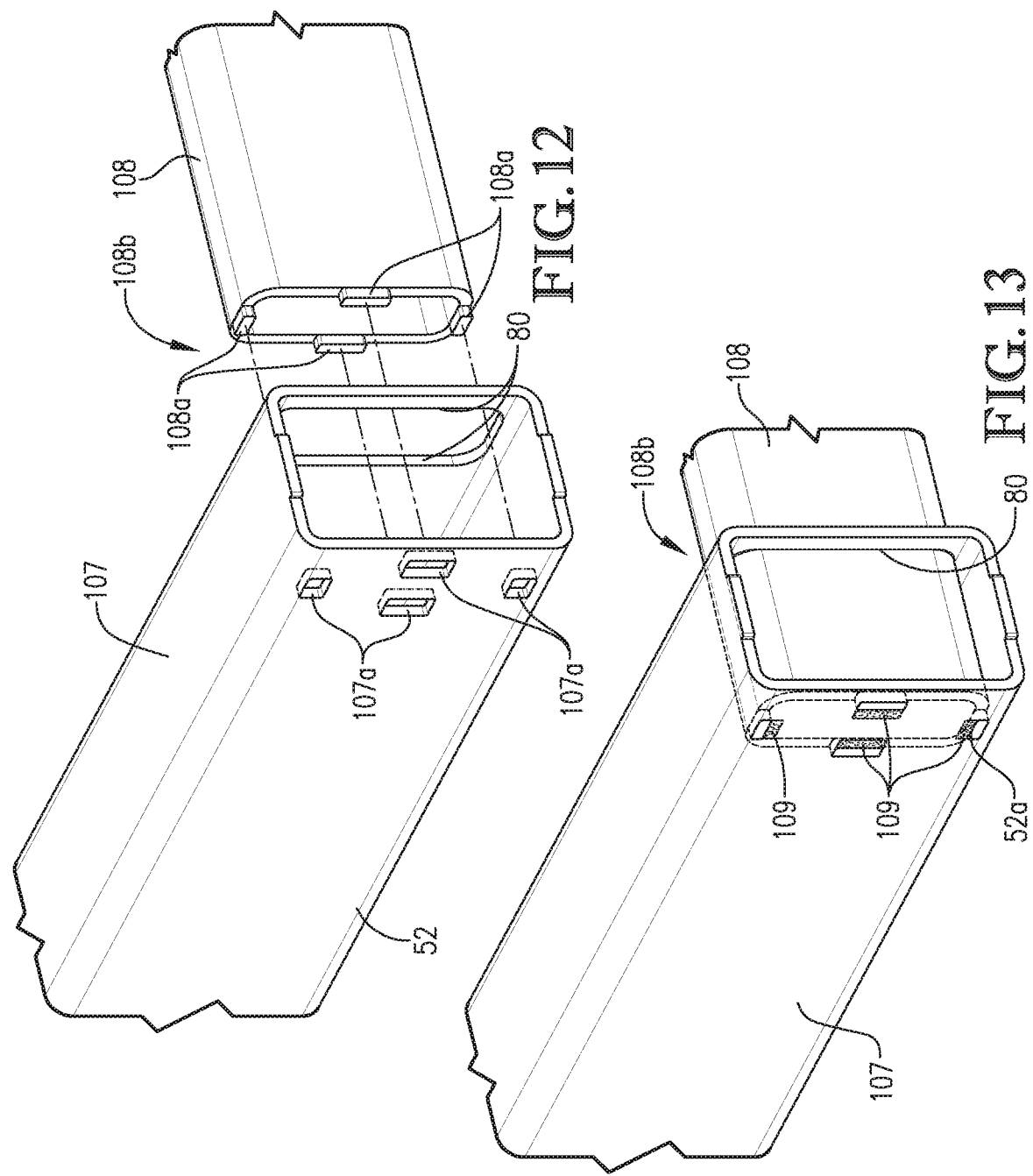

AGRICULTURAL IMPLEMENT FRAME ASSEMBLY

RELATED APPLICATION

This application claims the benefit of U.S. Provisional Application Ser. No. 62/628,549, filed Feb. 9, 2018, entitled AGRICULTURAL IMPLEMENT FRAME ASSEMBLY, and U.S. Provisional Application Ser. No. 62/628,558, filed Feb. 9, 2018, entitled MOUNTING BRACKET FOR AGRICULTURAL ROW UNIT, each of which is hereby incorporated in its entirety by reference herein.

BACKGROUND

1. Field

The present invention relates generally to agricultural implements. More specifically, embodiments of the present invention concern an implement frame with lateral frame members and fore-and-aft extending interconnecting members joined at frame joints.

2. Discussion of Prior Art

It is well known that agricultural implements are designed to include an implement framework to support implement components (such as soil openers) and facilitate implement usage and transportation. In various conventional forms, the implement framework can include one or more rigid frame elements (such as beams, bars, plates, or other similar structures) fixed or otherwise attached to one another. In some known embodiments, a beam is abutted with and welded to another beam (see FIGS. 1A-1, 1A-2, and 1A-3). In other known embodiments, a beam is abutted with and attached to another beam by welding a pair of plates to both beams (see FIGS. 1B-1, 1B-2, and 1B-3). In other known embodiments, a beam is abutted with and attached to another beam by welding a pair of tubular members to both beams (see FIGS. 1C-1, 1C-2, and 1C-3).

Conventional implement frameworks, such as those shown in FIGS. 1A, 1B, and 1C, have various deficiencies. For instance, butt-welded frame connections are generally formed by multiple welding passes that experience excessive heat buildup and are relatively brittle. Such connections are also relatively time consuming to produce, which causes the frame manufacturing process to be unduly expensive.

The depicted prior art frame connections comprise welded joints that experience cyclical tension, compression, and bending loads, which leads to fatigue crack formation along the welds. The depicted frame elements also require substantial fixturing work in order to accurately assemble the frame elements for welding.

SUMMARY

The following brief summary is provided to indicate the nature of the subject matter disclosed herein. While certain aspects of the present invention are described below, the summary is not intended to limit the scope of the present invention.

Embodiments of the present invention provide an agricultural implement that does not suffer from the problems and limitations of the prior art implements set forth above.

An aspect of the present invention concerns an agricultural implement configured to be advanced in a forward direction. The implement broadly includes an implement frame including a pair of laterally extending fore-and-aft spaced frame members. The frame also includes a fore-and-aft extending interconnecting member that extends between the frame members and presents forward and aft ends. At least one of the frame members comprises a tubular beam presenting forward and aft walls. The forward and aft walls at least partly define an interior beam space, with a window opening being defined in a first one of the walls. The tubular beam receives a respective end of the interconnecting member so that the interconnecting member extends into and out of the interior beam space through the window opening. The respective end of the interconnecting member is welded to a second one of the walls.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein:

FIG. 1A-2 is a rear perspective of the framework shown in FIG. 1A-1;

FIG. 1A-3 is a side elevation of the framework shown in FIGS. 1A-1 and 1A-2;

FIG. 1B-1 is a front perspective of a conventional framework having frame members joined at a frame joint that is butt-welded and includes upper and lower overlapping plates welded to the frame members;

FIG. 1B-2 is a rear perspective of the framework shown in FIG. 1B-1;

FIG. 1B-3 is a side elevation of the framework shown in FIGS. 1B-1 and 1B-2;

FIG. 1C-1 is a front perspective of a conventional framework having frame members joined at a frame joint that is butt-welded and includes upper and lower overlapping tubes welded to the frame members;

FIG. 1C-2 is a rear perspective of the framework shown in FIG. 1C-1;

FIG. 1C-3 is a side elevation of the framework shown in FIGS. 1C-1 and 1C-2;

FIG. 2 is a top plan view of an agricultural implement with multiple row units constructed in accordance with a preferred embodiment of the present invention, with the implement including central and wing subframes supported by wheel subframes, and further including row units mounted on frame members of the central and wing subframes;

FIG. 3 is a fragmentary front perspective of the agricultural implement shown in FIG. 2, showing the row units in a transport position where the row units are spaced above the ground, and further showing the pivotal attachment of one of the wing subframes to the central subframe;

FIG. 12 is a front perspective of an alternative subframe similar to the one wing subframe shown in FIGS. 2, 3, and 6-11, showing an alternative frame member and an alternative interconnecting member, with the interconnecting member including tabs that are slidably received in enlarged slotted openings;

FIG. 13 is a front perspective of the alternative subframe similar to FIG. 12, but showing weld material applied within the slotted openings to fix the tabs of the interconnecting member to the frame member;

Figures 1, 1A:
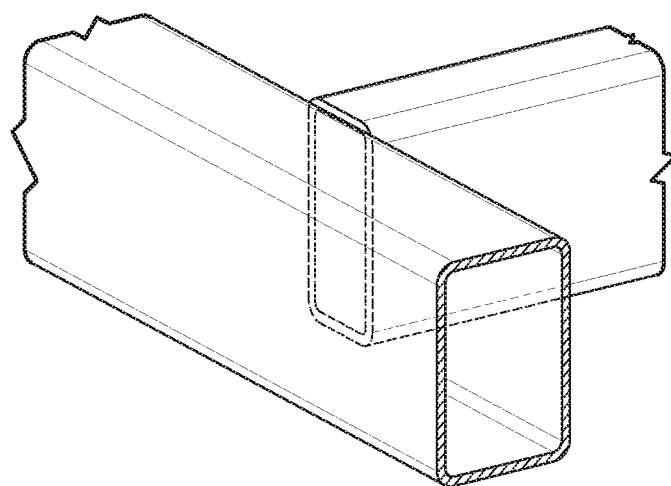
FIG. 1A-1 is a front perspective of a conventional framework having frame members joined at a butt-welded frame joint.
Figures 1, 1A, 2:
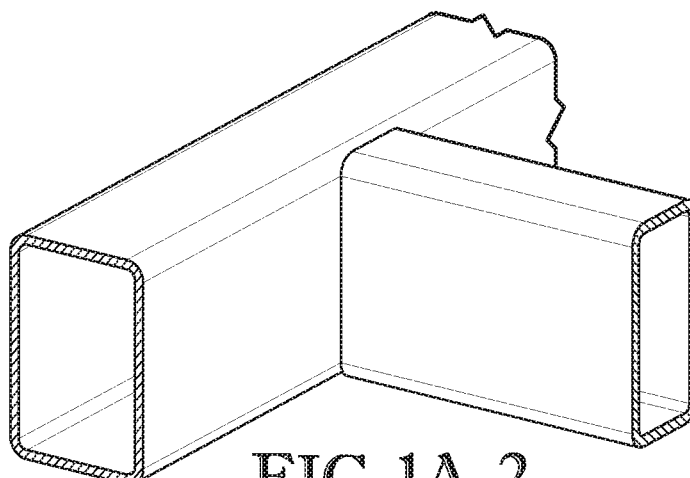
Figures 1, 1A, 2, 3:
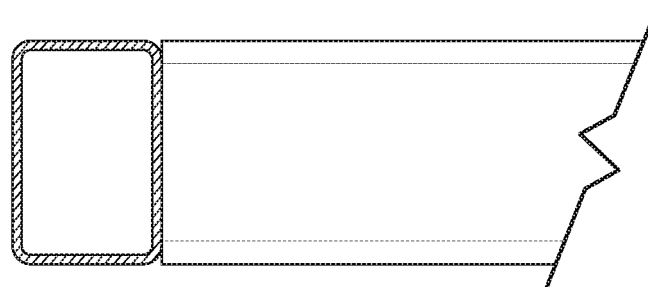
Figures 1, 1B:
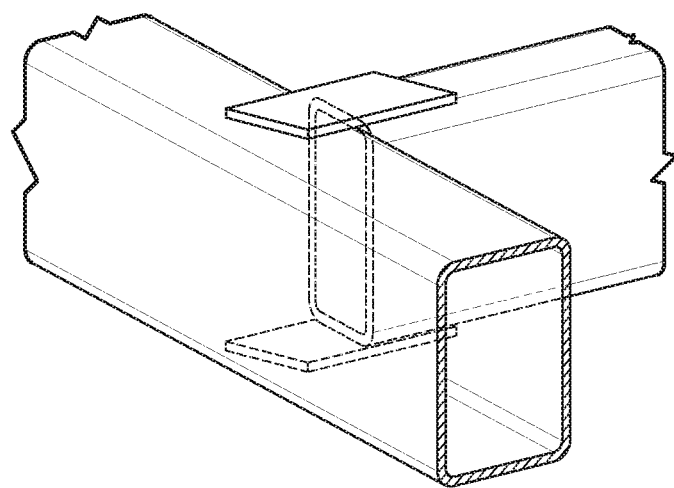
Figures 1, 1B, 2:
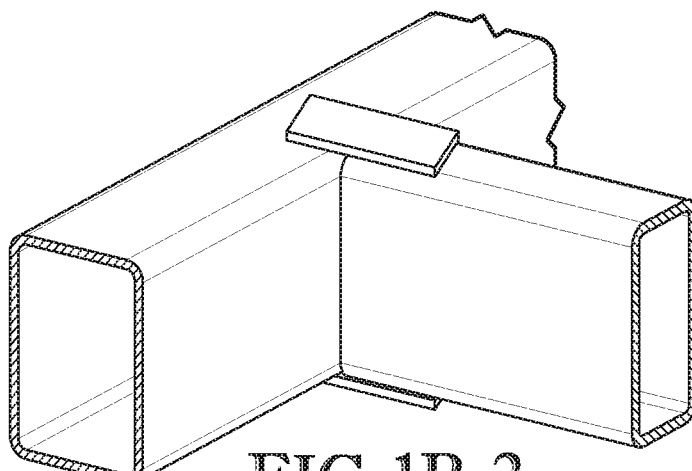
Figures 1, 1B, 2, 3:
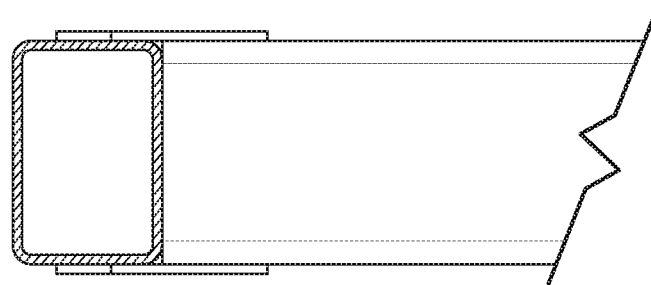
Figures 1, 1C:
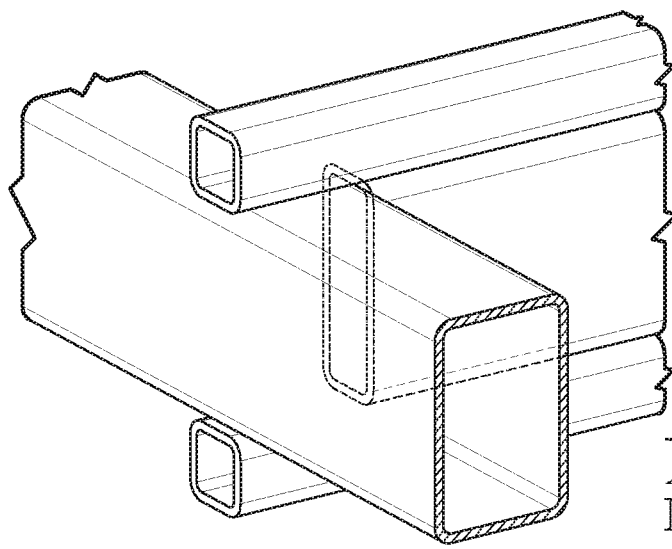
Figures 1, 1C, 2:
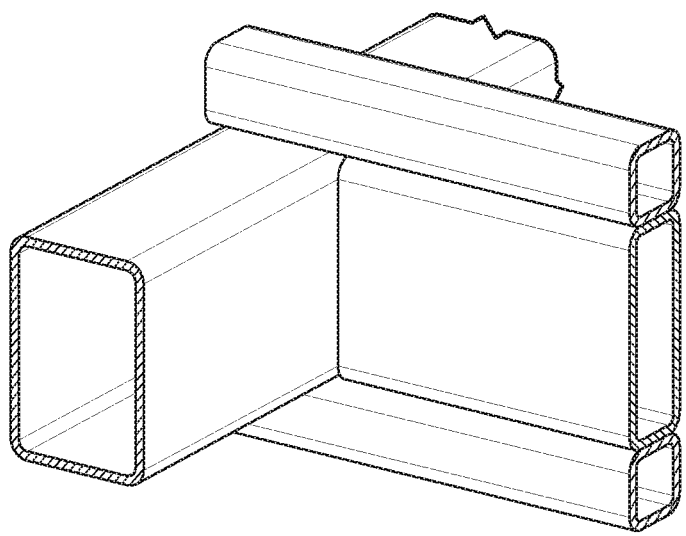
Figures 1, 1C, 2, 3:
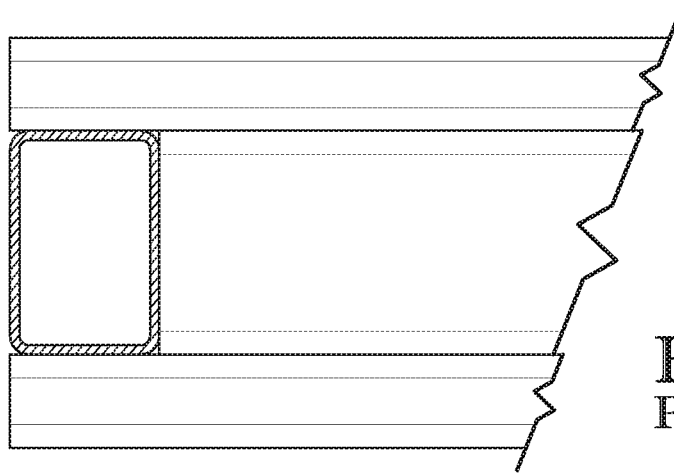
Figure 1D:
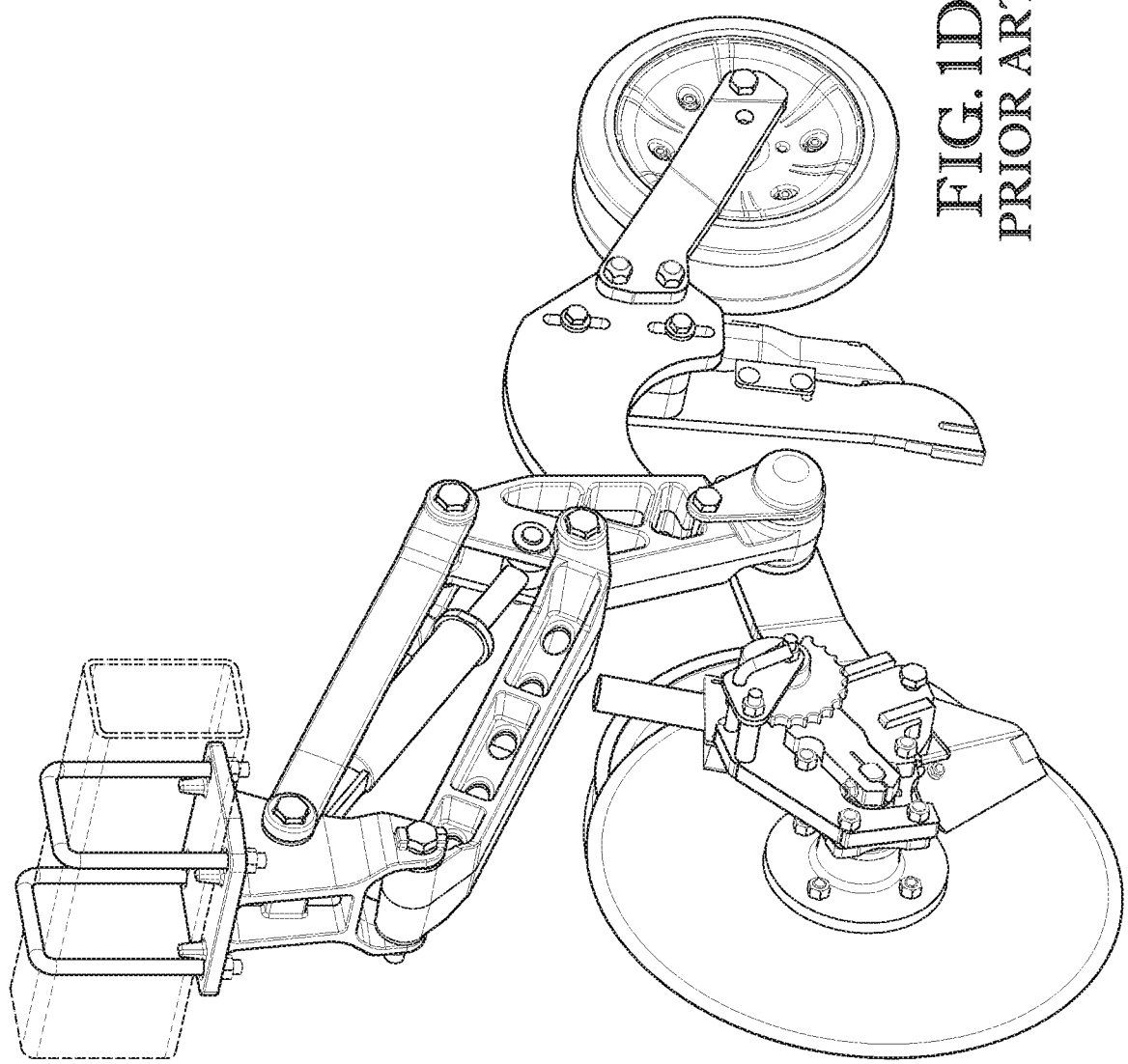
FIG. 1D is a front perspective of a conventional opener that includes a mounting bracket to secure the opener to a toolbar, with the bracket including U-bolts.
Figure 1E:
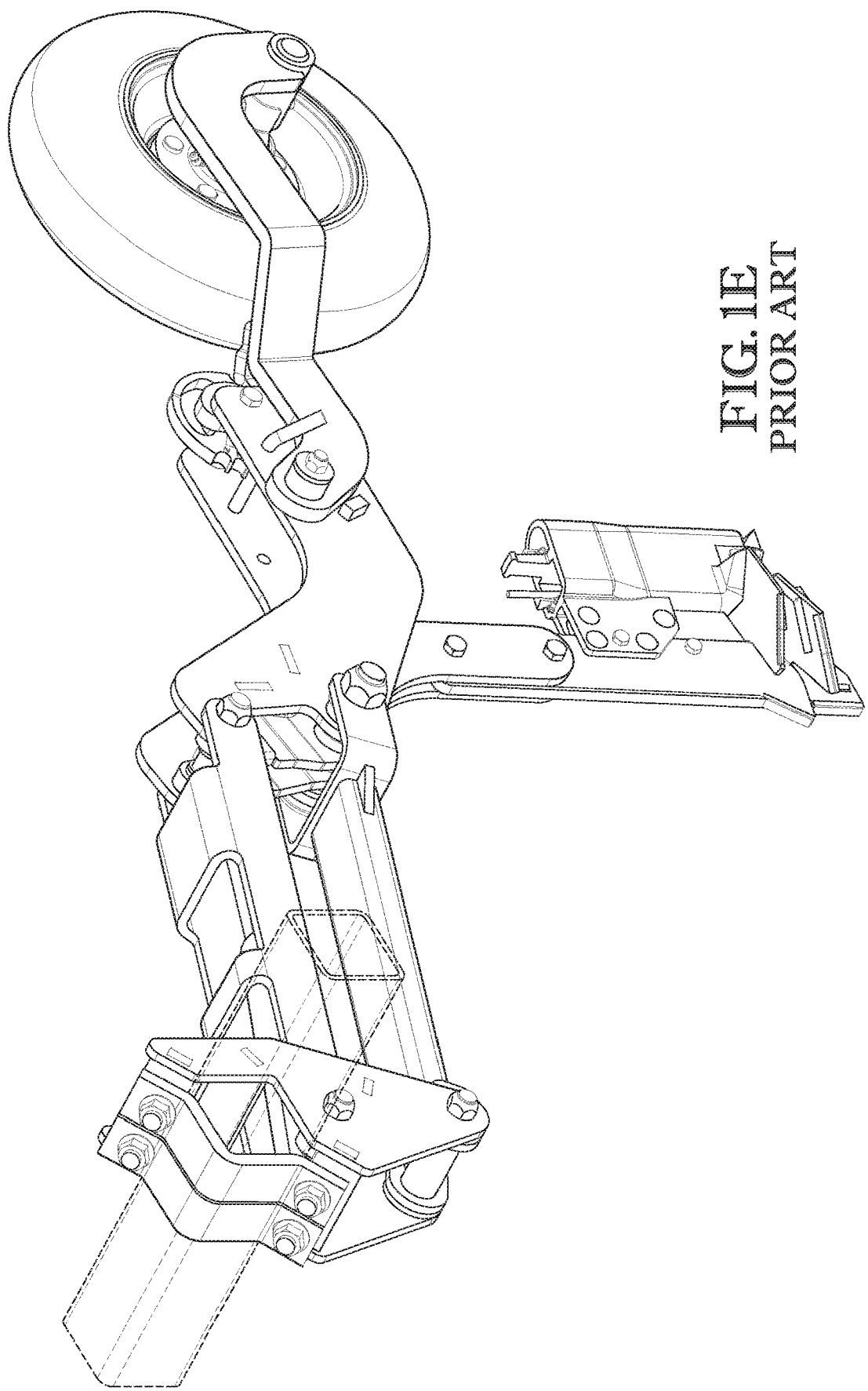
FIG. 1E is a front perspective of a conventional opener that includes a mounting bracket to secure the opener to a toolbar, with the bracket including clamp straps and carriage bolts.
Figure 1F:
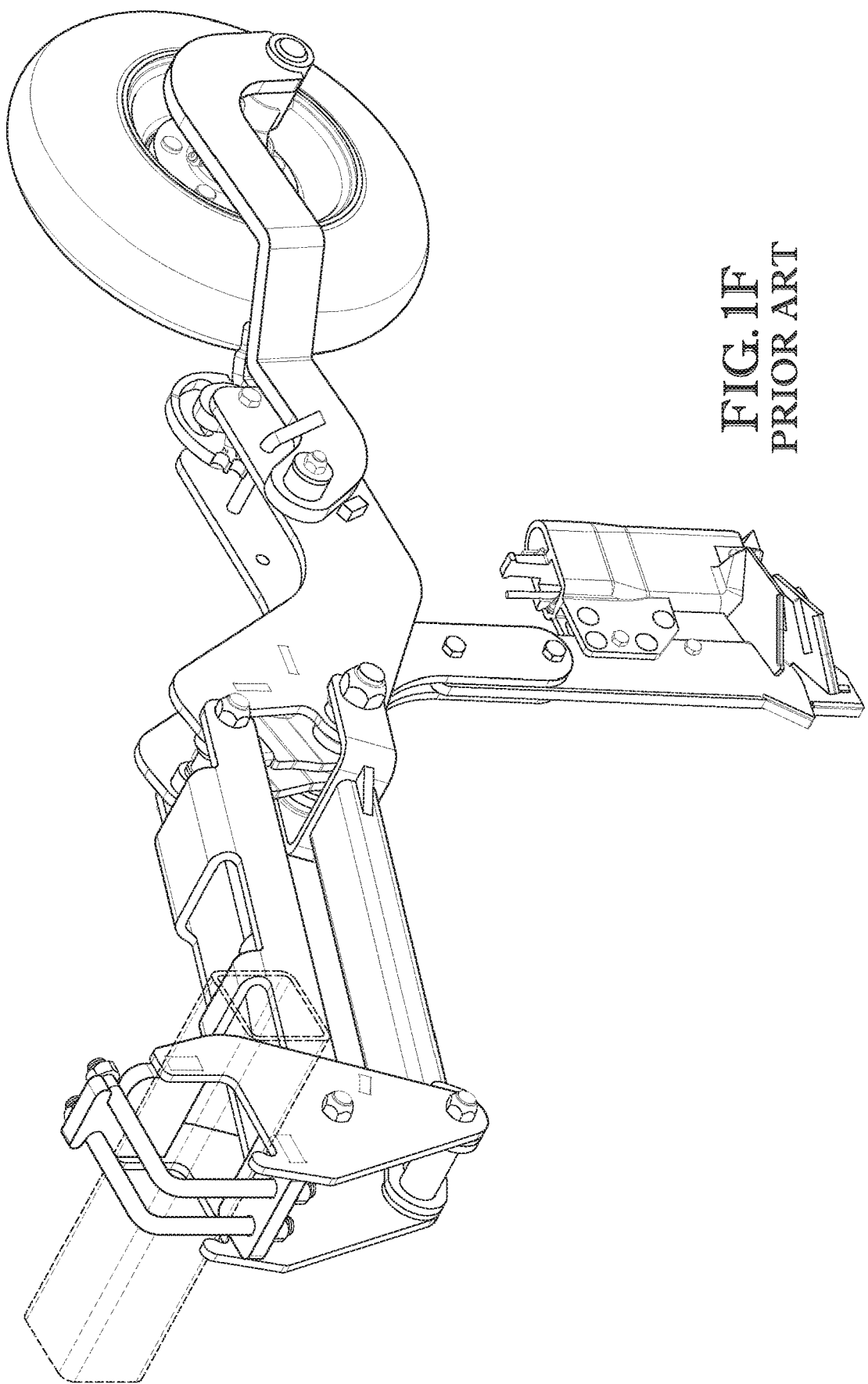
FIG. 1F is a front perspective of a conventional opener that includes a mounting bracket to secure the opener to a toolbar, with the bracket including L-shaped bolts.
Figure 2:
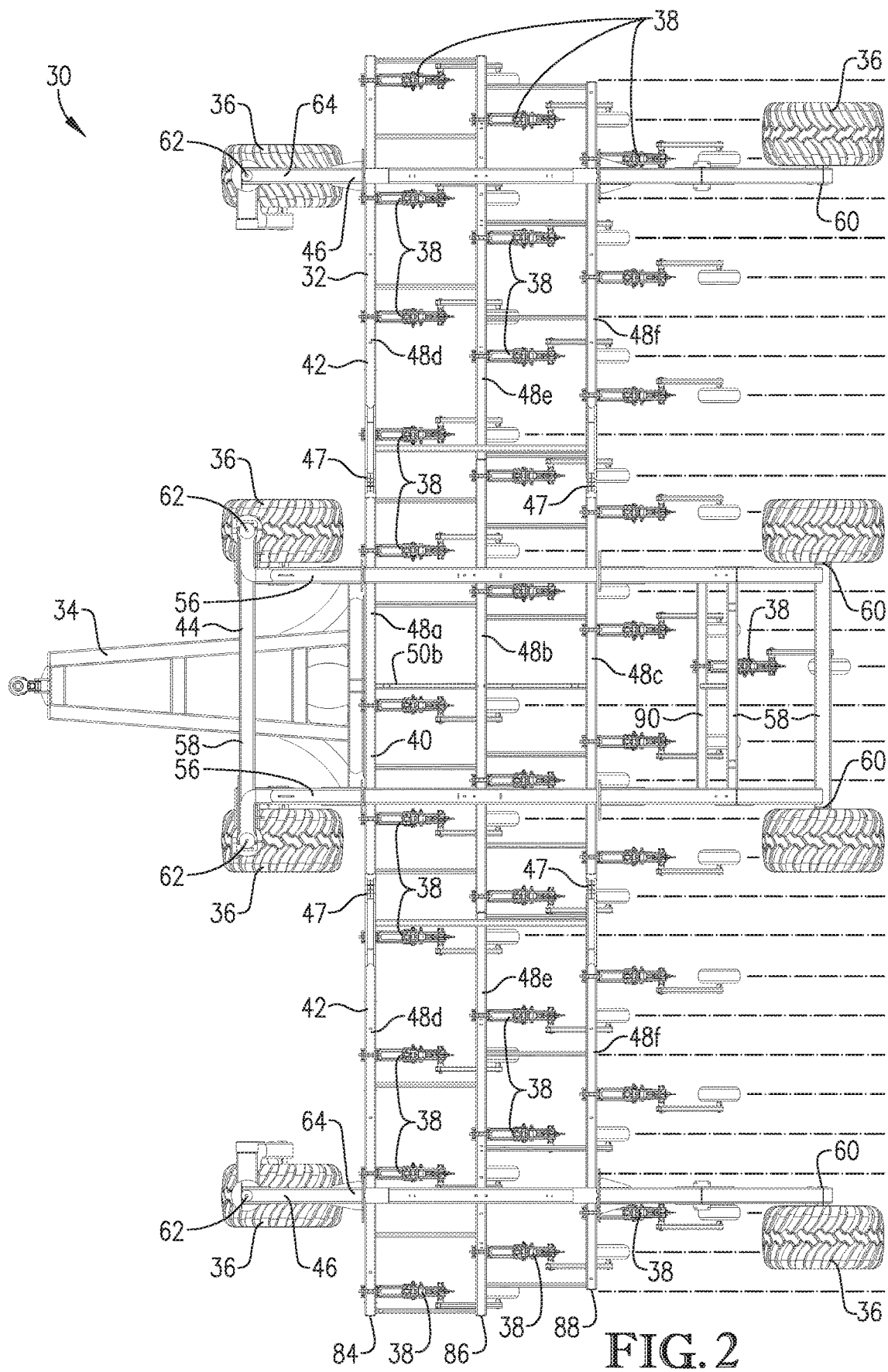
Figure 3:
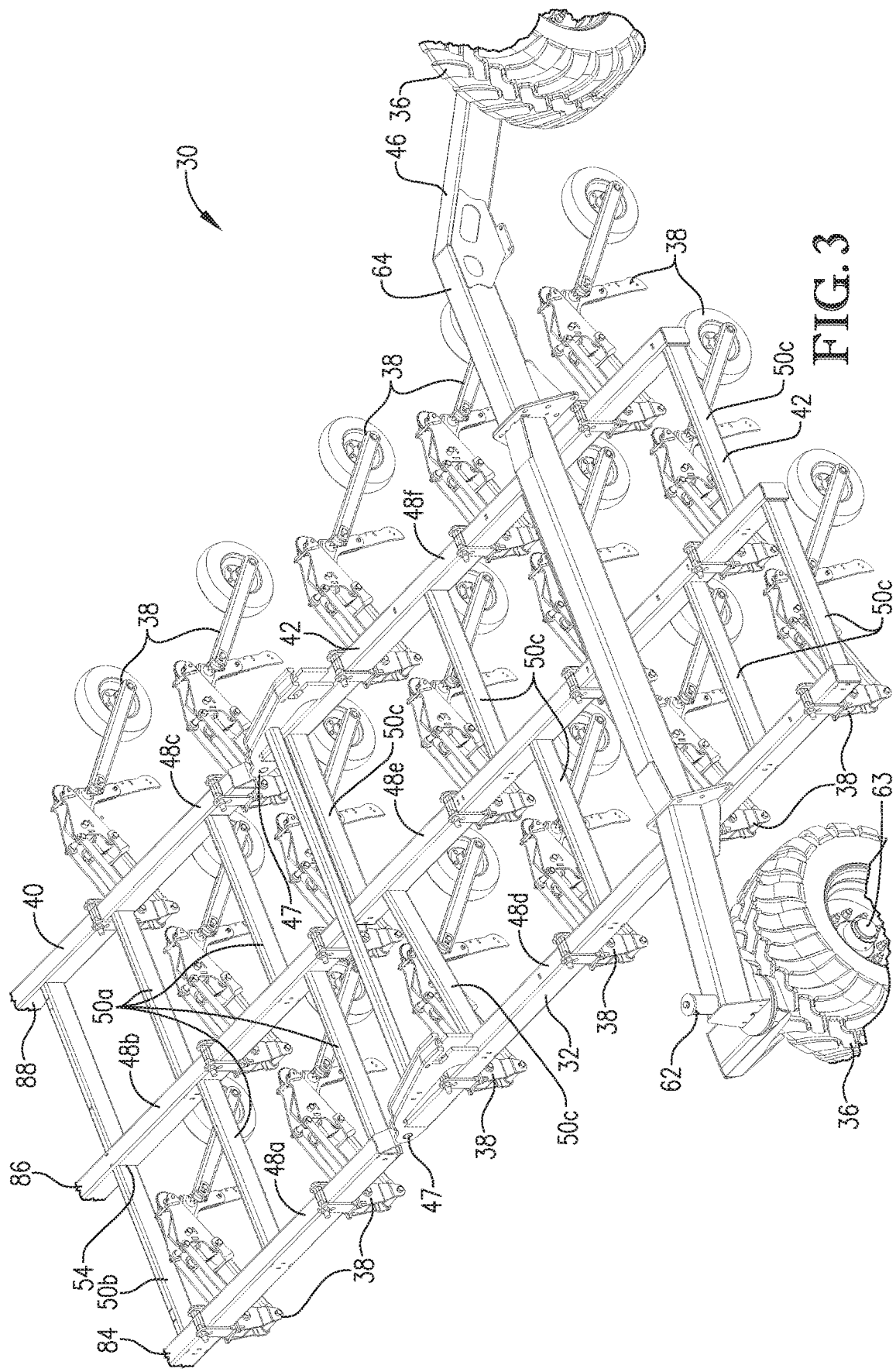
Figure 4:
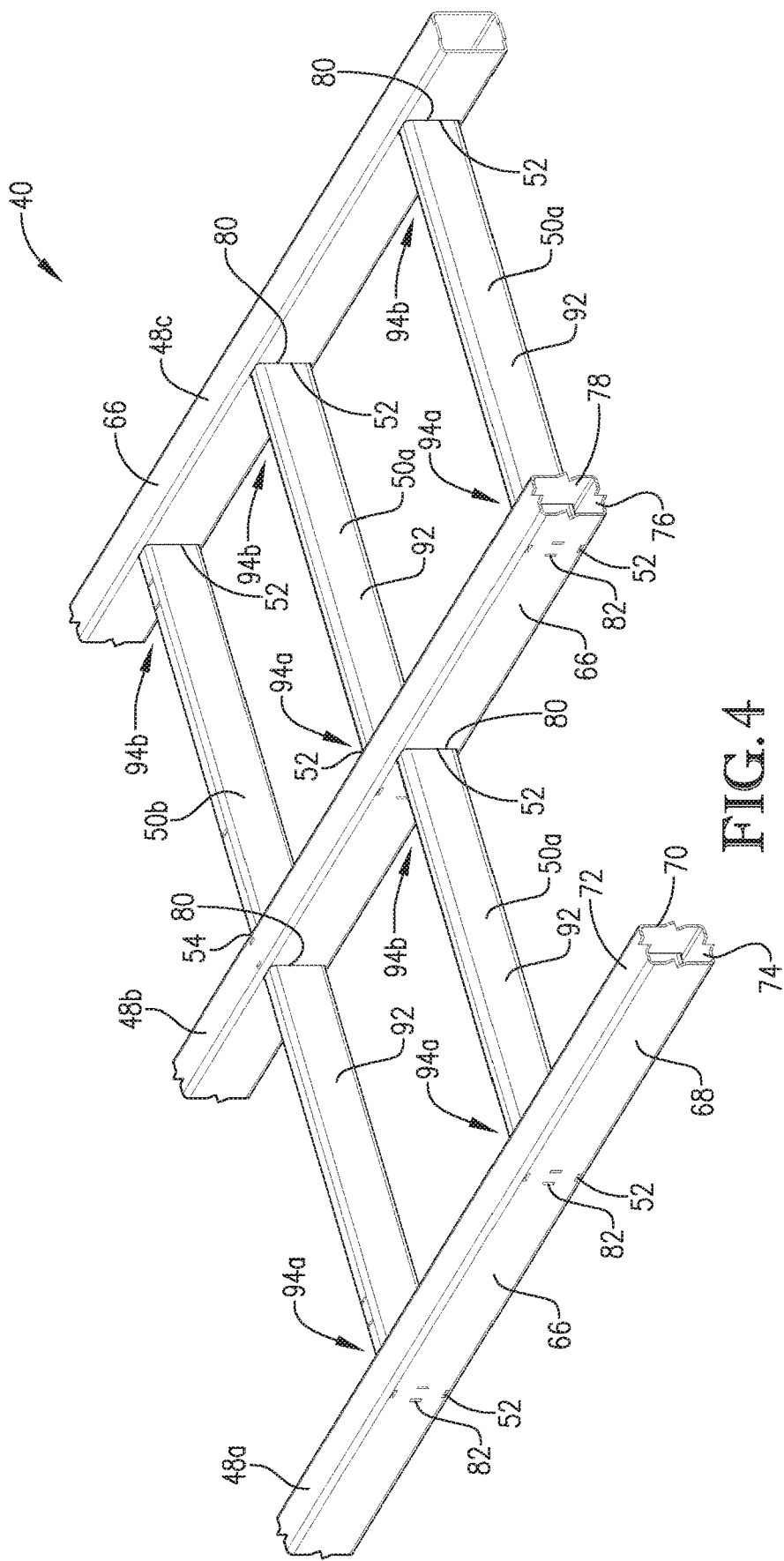
FIG. 4 is a fragmentary front perspective of the central subframe shown in FIGS. 2 and 3, including laterally extending frame members and fore-and-aft extending interconnecting members.
Figure 5:
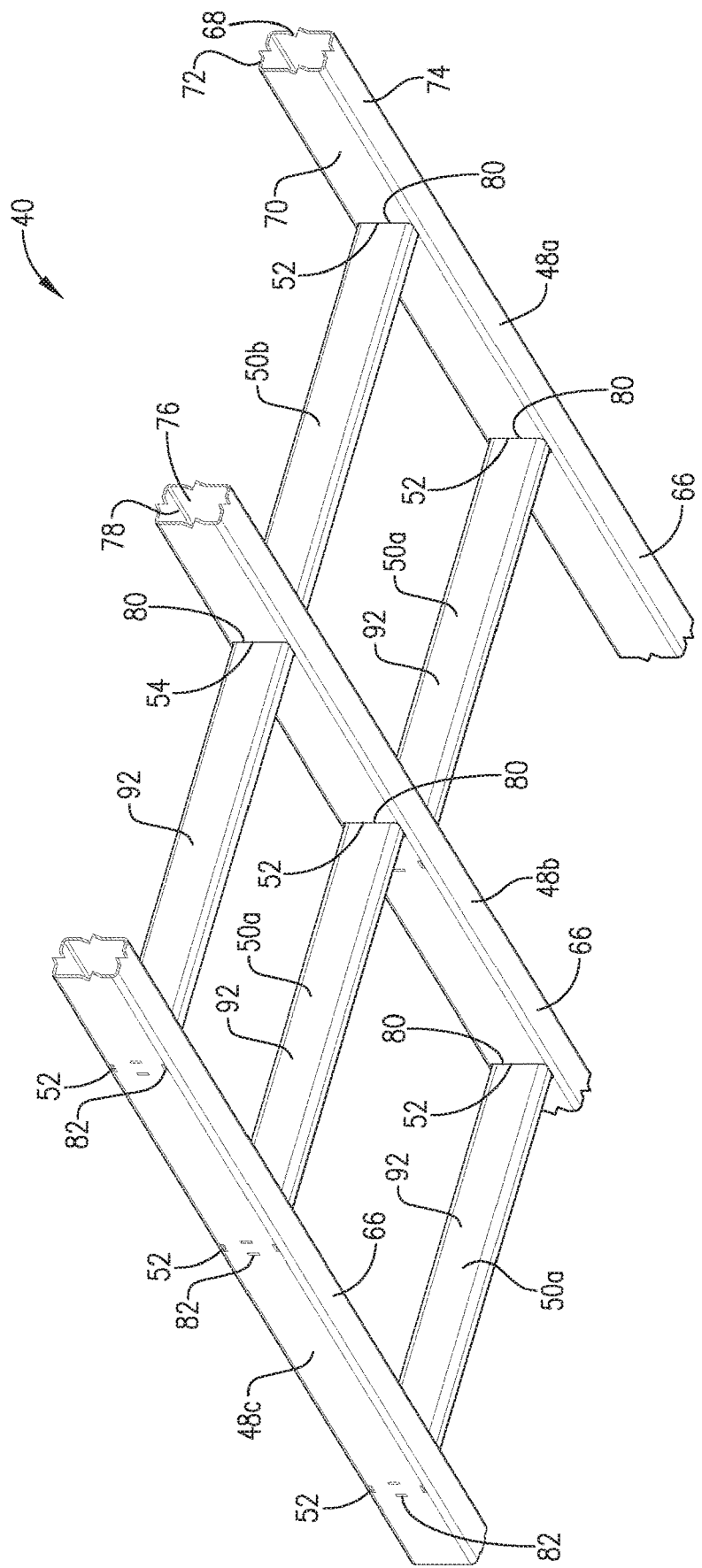
FIG. 5 is a fragmentary rear perspective of the central subframe similar to FIG. 4, but taken from the opposite side.
Figure 6:
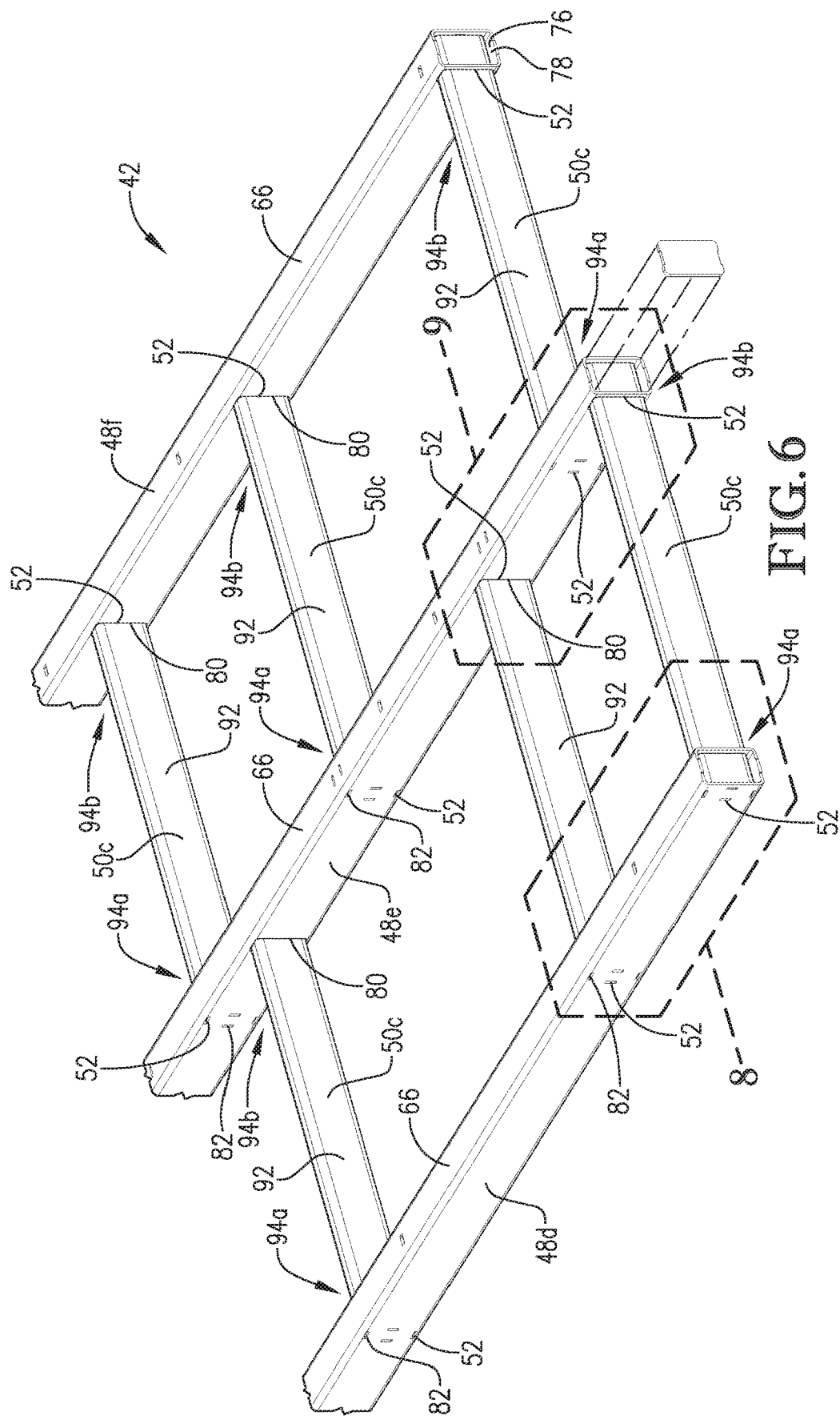
FIG. 6 is a fragmentary front perspective of one of the wing subframes shown in FIGS. 2 and 3, including laterally extending frame members and fore-and-aft extending interconnecting members.
Figure 14:
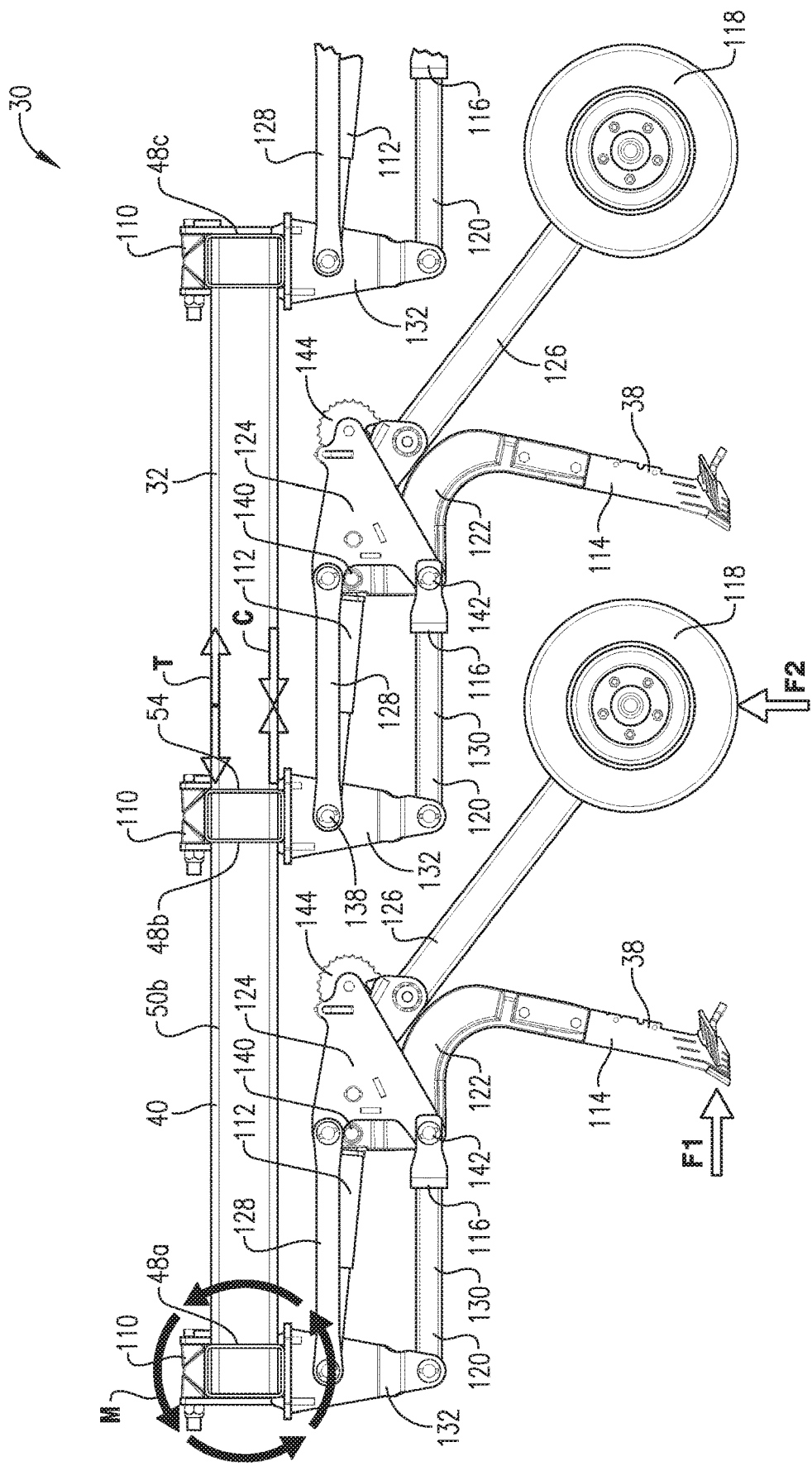
Figure 15:
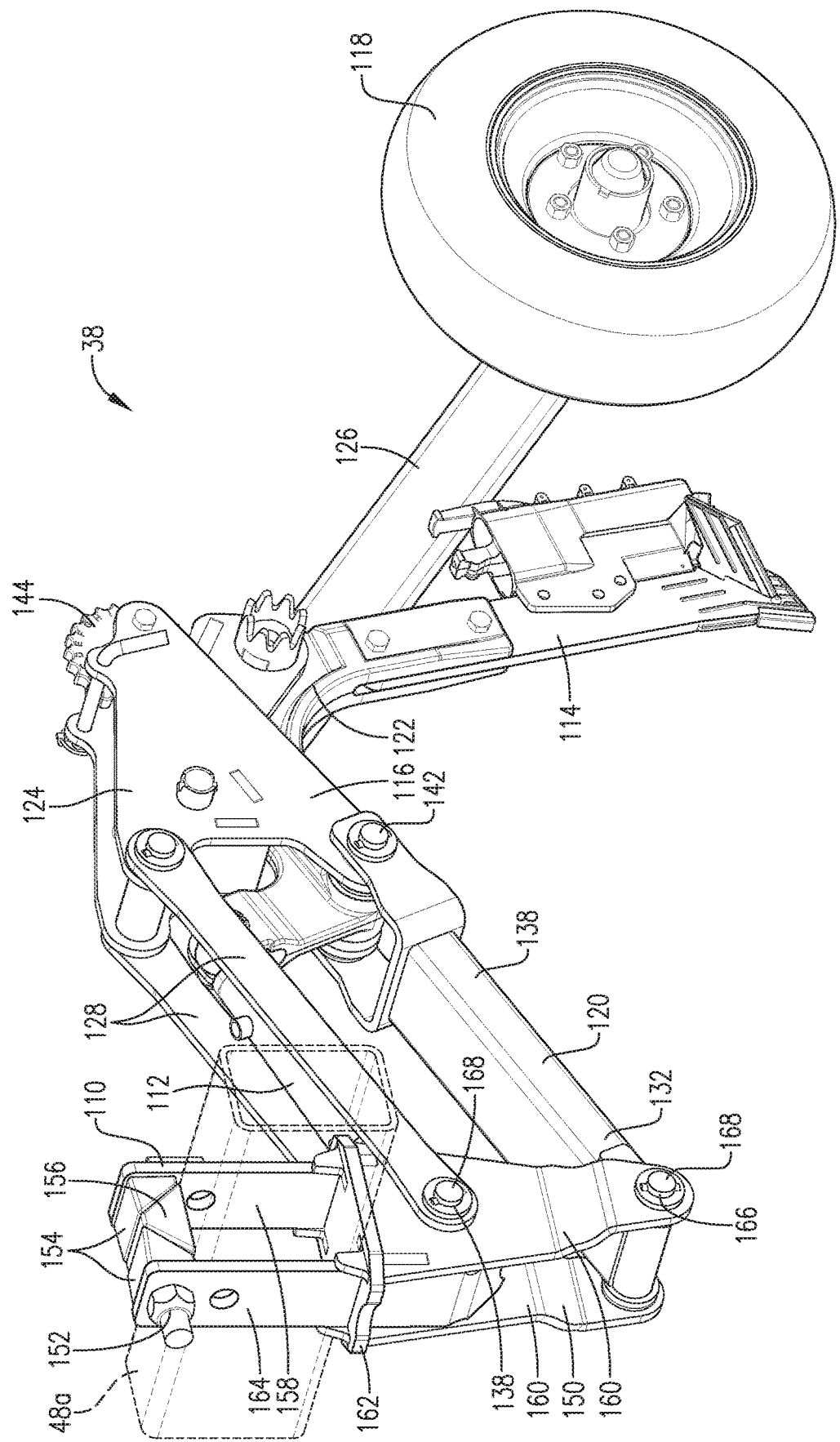
Figure 16:
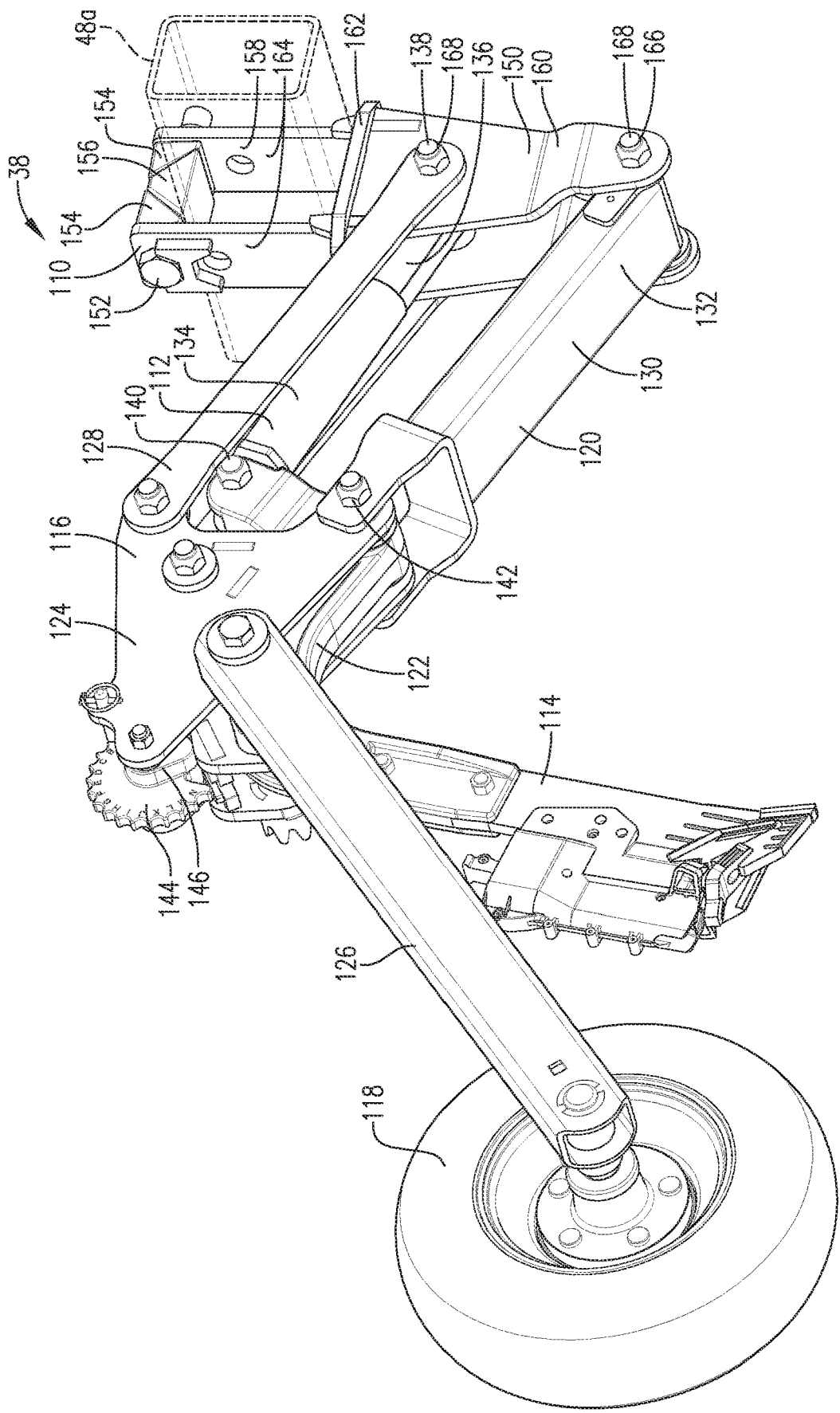
Figure 17:
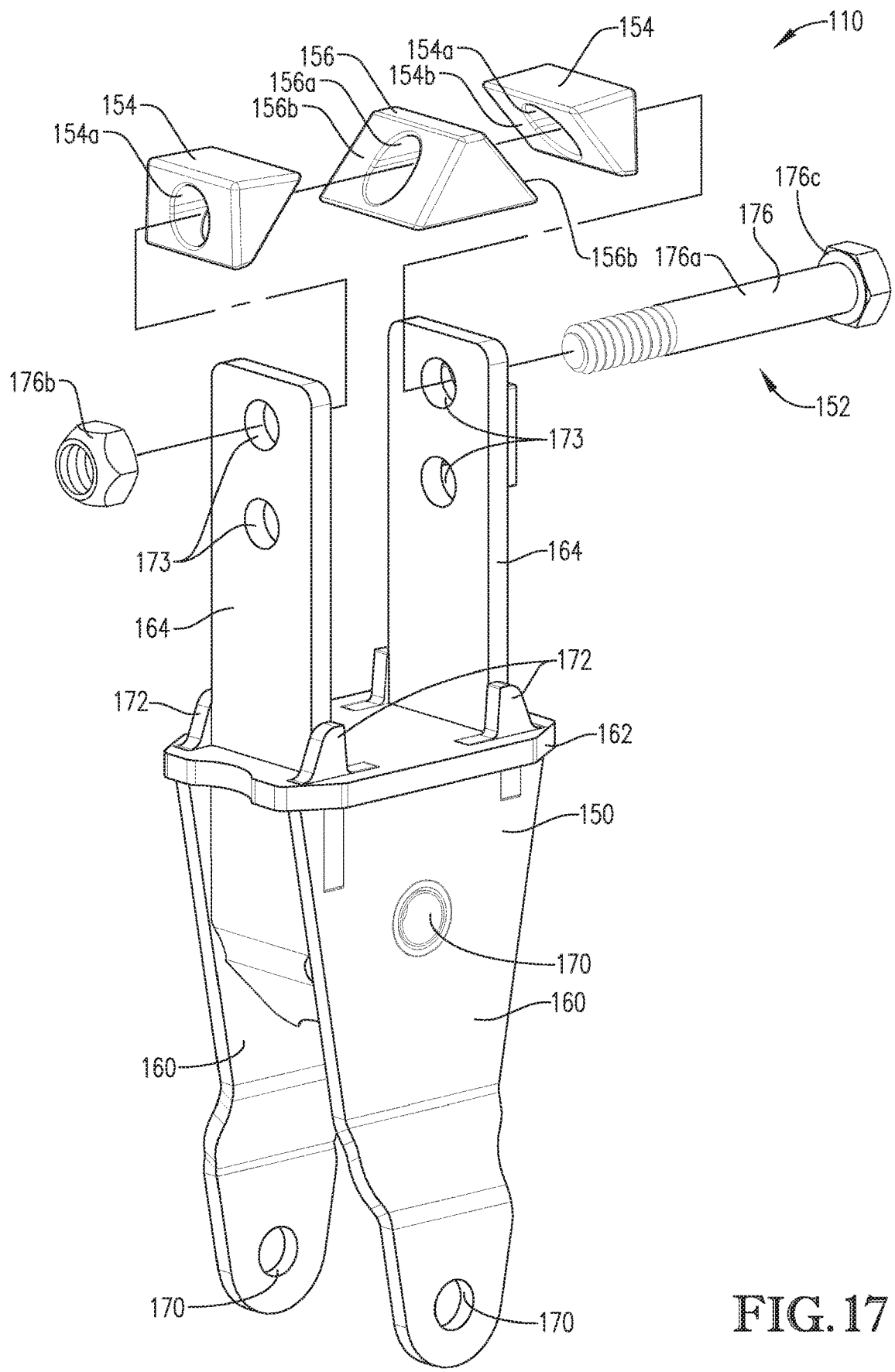
Figure 18:
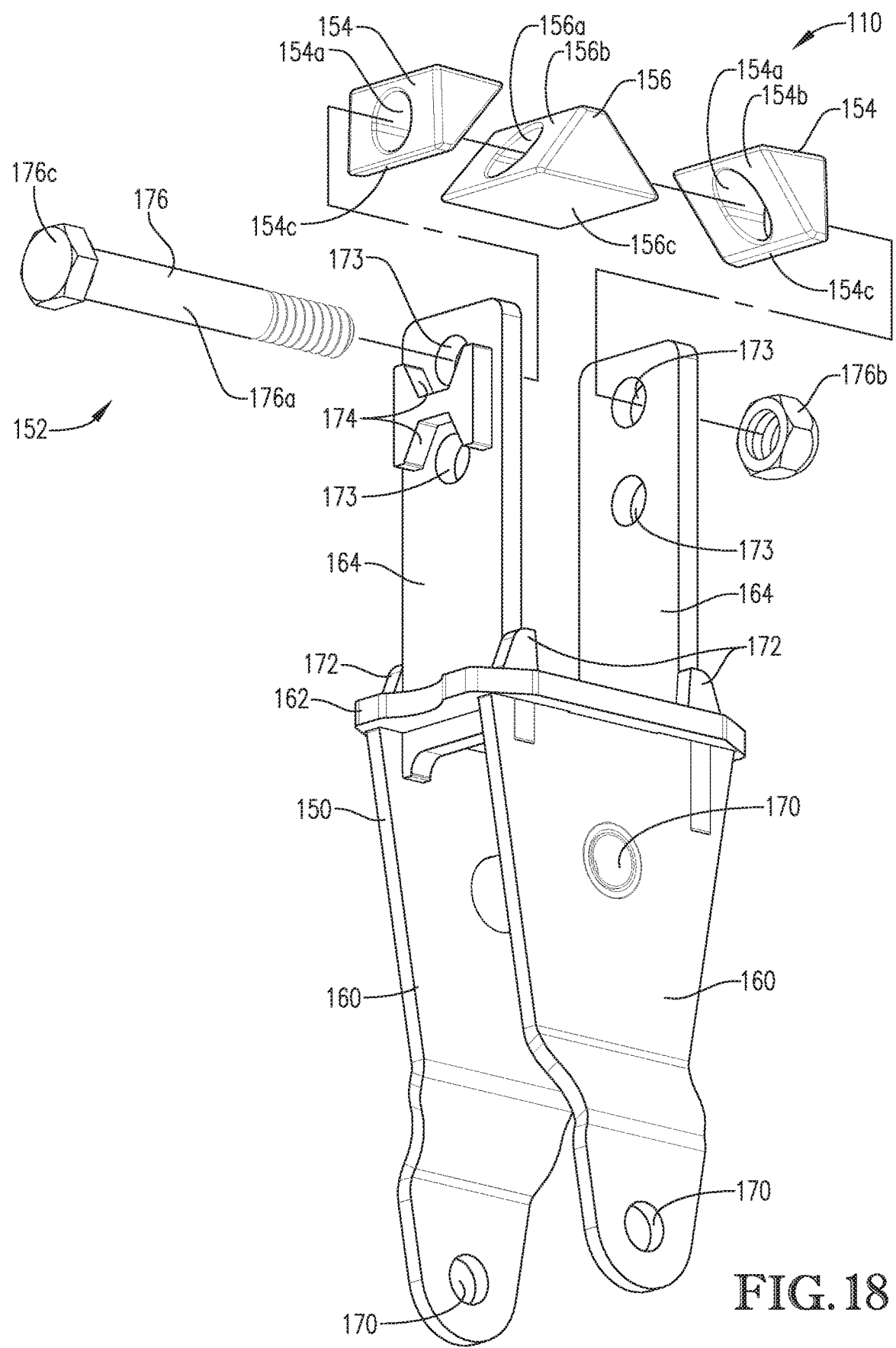
Figure 19:
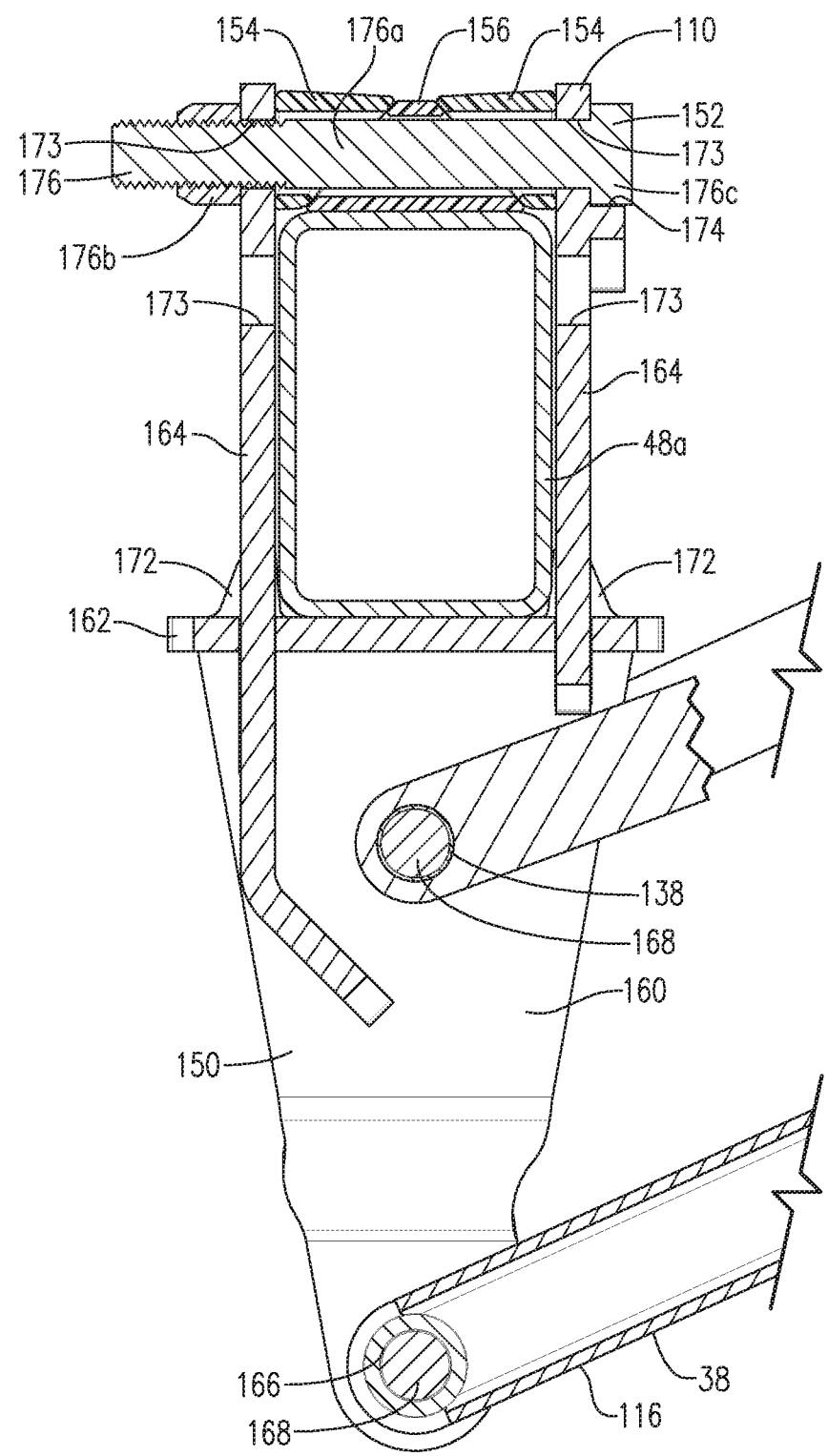
Figure 20:
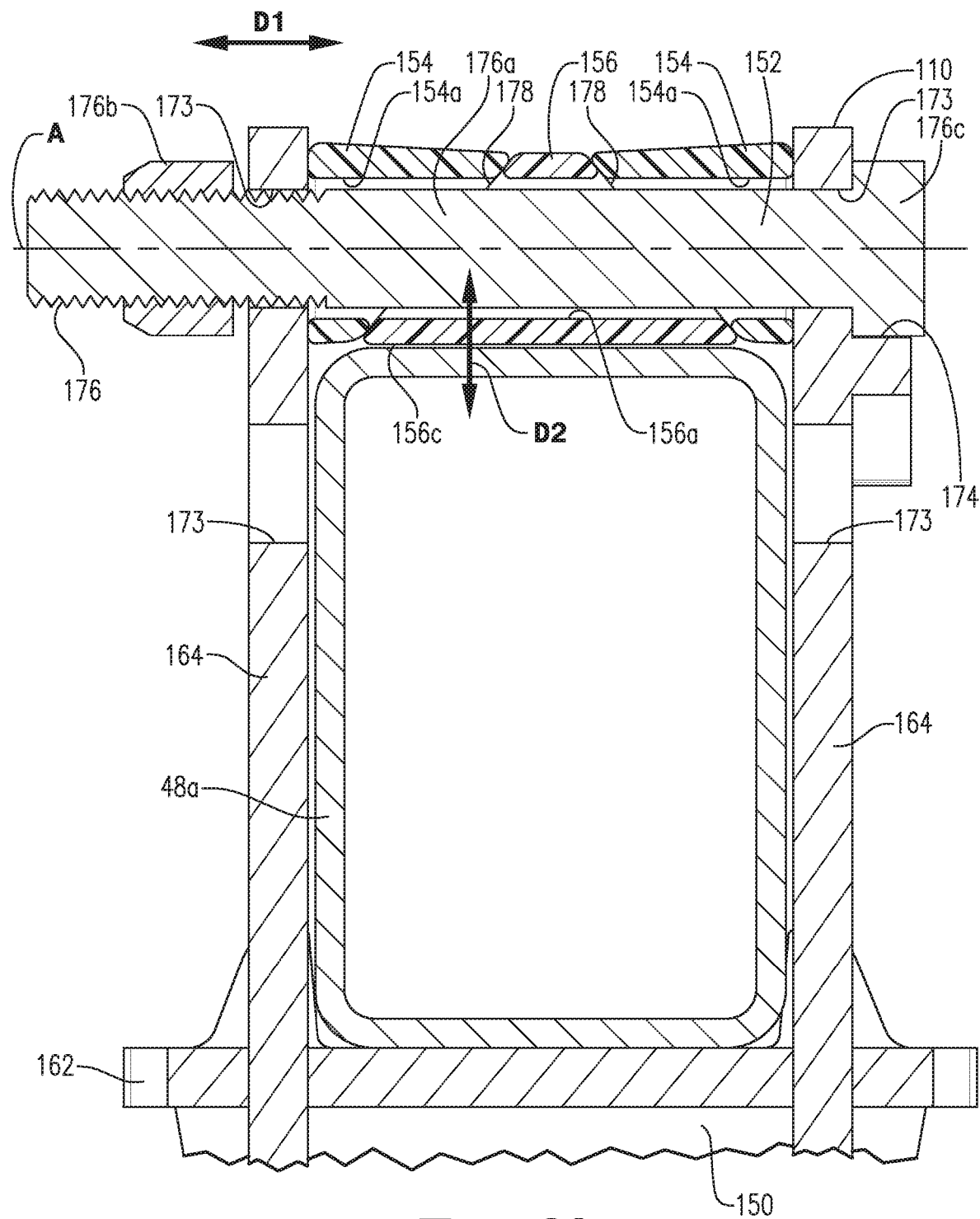
Figure 21:
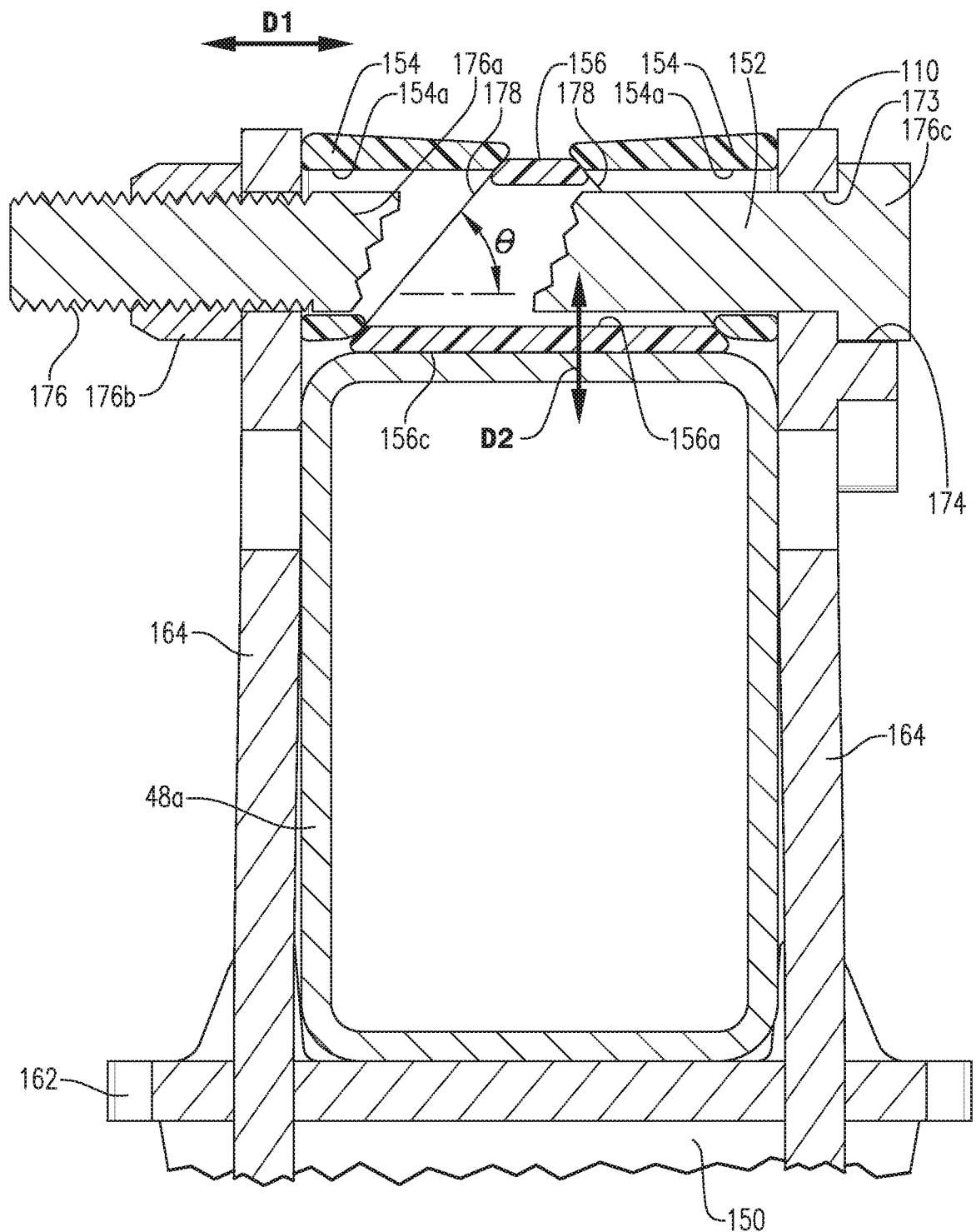

FIG. 14 is a side elevation of the agricultural implement shown in FIGS. 2 and 3, showing the row units mounted on corresponding frame members and including, among other things, a mounting device, actuator, dispensing assembly, suspension, and gauge wheel, with the row units in an operating position in which the row units engage the ground and apply forces to the frame members and interconnecting members;

FIG. 15 is a front perspective of one of the row units shown in FIGS. 2, 3, and 14, showing the row unit in a transport position;

FIG. 16 is a fragmentary rear perspective of the agricultural implement similar to FIG. 15, but taken from the opposite side;

FIG. 17 is an enlarged exploded front perspective of part of the row unit shown in FIGS. 2, 3, 15, and 16, particularly depicting the various components of the mounting device;

FIG. 18 is an enlarged exploded rear perspective of the mounting device similar to FIG. 17, but taken from the opposite side;

FIG. 19 is a cross-sectional view of the row unit shown in FIGS. 15-18, showing the row unit supported on the frame member;

FIG. 20 is an enlarged cross-sectional view of the row unit similar to FIG. 19, but showing the cam element shifter loosened and the driven cam element out of gripping engagement with the frame member; and FIG. 21 is an enlarged cross-sectional view of the row unit similar to FIG. 20, but showing the cam element shifter in a tightened condition, where the driving cam elements shift the driven cam element downwardly into engagement with the frame member, and the cam element shifter moving the mounting arms of the mounting bracket toward each other and into engagement with the frame member.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Turning initially to FIGS. 2 and 3, an agricultural implement 30 is constructed in accordance with a preferred embodiment of the present invention and is configured to be advanced in a forward direction F along the ground. In the usual manner, the implement 30 is drawn by a self-propelled agricultural tractor (not shown) or another self-propelled vehicle. The illustrated implement 30 broadly includes an implement frame 32, a hitch 34, wheels 36, and row units 38.

As will be explained, each of the row units 38 preferably comprises an opener and are configured to dispense seed and/or fertilizer in a furrow (not shown) while being advanced. In the usual manner, the row units 38 are preferably advanced as part of the implement 30 by being towed behind an agricultural vehicle (not shown). Certain aspects of the present invention are also applicable where the implement includes one or more tool units other than the depicted row units. As will be explained below, the implement could include, alternatively or additionally to the row units, various types of trip units or other tool units.

Implement Frame

The implement frame 32 is configured to support the row units 38 for advancement along the ground. As will be explained, the implement frame 32 is configured to support torsional forces M applied by the row units 38 (see FIG. 14) while resisting frame deflection and damage.

The implement frame 32 preferably includes a central subframe 40, a pair of wing subframes 42, a laterally inboard wheel subframe 44, and laterally outboard wheel subframes 46. Each wing subframe 42 is pivotally attached to a corresponding side of the central subframe 40 at pivot joints 47 (see FIGS. 2 and 3). The pivot joints 47 permit the wing subframes 42 to be swung between an upright folded condition (not shown), primarily for transport, and an extended unfolded condition (see FIGS. 2 and 3), primarily for operation.

As will be explained, each of the subframes 40, 42 includes a series of laterally extending fore-and-aft spaced frame members 48 and fore-and-aft extending interconnecting members 50. The members 48 and 50 are joined to each other at respective end frame joints 52 and pass-through frame joint 54 (see FIGS. 4-11).

Referring again to FIGS. 2 and 3, the inboard wheel subframe 44 is configured to be fixed relative to the hitch 34 and is operable to support the central unit subframe 40 for rolling advancement along the ground.

The inboard wheel subframe 44 includes a pair of longitudinal beams 56 and cross members 58 that interconnect the beams 56 (see FIG. 2). The inboard wheel subframe 44 is operably supported by front and rear wheels 36. The rear wheels 36 are attached to the respective cross member 58 at lateral axles 60 that permit the wheels to spin about lateral axes (see FIG. 2). The front wheels 36 are attached to the respective cross member 58 at a swivel axle 62 that permits the front wheels 36 to swing about respective vertical axes (see FIG. 2). While being configured to swivel, the front wheels 36 are also attached at wheel axles 63 to spin about lateral axes (see FIG. 3). The front wheels 36 are configured to freely swivel so as to facilitate turning movement of the implement 30.

The outboard wheel subframes 46 are configured to be attached relative to the wing subframes 42 and are operable to support the wing subframes 42 for rolling advancement along the ground.

The outboard wheel subframes 46 each include a longitudinal beam 64 (see FIGS. 2 and 3). The outboard wheel subframes 46 are operably supported by respective front and rear wheels 36. The rear wheels 36 are attached to a rear end of the respective beam at an axle 60 to spin about a lateral axis (see FIG. 2). The front wheels 36 are attached to a front end of the respective beam at a swivel axle 62 that permits the front wheels 36 to swing about respective vertical axes (see FIG. 3). While being configured to swivel, the front wheels 36 are also attached at wheel axles 63 to spin about lateral axes (see FIG. 3). The front wheels 36 associated with the outboard wheel subframes 46 are configured to freely swivel so as to facilitate turning movement of the implement 30.

The principles of the present invention are equally applicable where the implement frame has an alternative wheel configuration for facilitating rolling movement during operation and transport.

Turning to FIGS. 3-11, the central subframe 40 preferably includes frame members 48a, b, c and multiple interconnecting members 50a, b. Similarly, each of the wing subframes 42 preferably includes frame members 48d, e, f and interconnecting members 50c.

Each frame member 48 preferably comprises a laterally-extending tubular beam 66 that extends continuously along its length. Each lateral tubular beam 66 has a generally rectangular cross-sectional profile that is substantially the same as the other tubular beams 66.

Each tubular beam 66 includes forward and aft upright walls 68, 70 that are connected by upper and lower walls 72, 74 (see FIGS. 4-11). The upper and lower walls 72, 74 define an interior height dimension H1 (see FIG. 8). The walls 68, 70, 72, 74 present an interior wall surface 76 and cooperatively define an interior beam space 78 (see FIG. 8).

It is also within the ambit of the present invention where the tubular beams 66 have an alternative cross-sectional profile. For instance, the tubular beams could have a circular, oval, square, or other polygonal profile. Furthermore, the tubular beams could have cross-sectional profiles that are different from one another. In various alternative embodiments, the tubular beam could have a cross-sectional profile that is not continuous. For instance, one of the walls and/or portions of walls of the tubular beam could be removed without departing from the spirit of certain aspects of the present invention.

Figure 7:
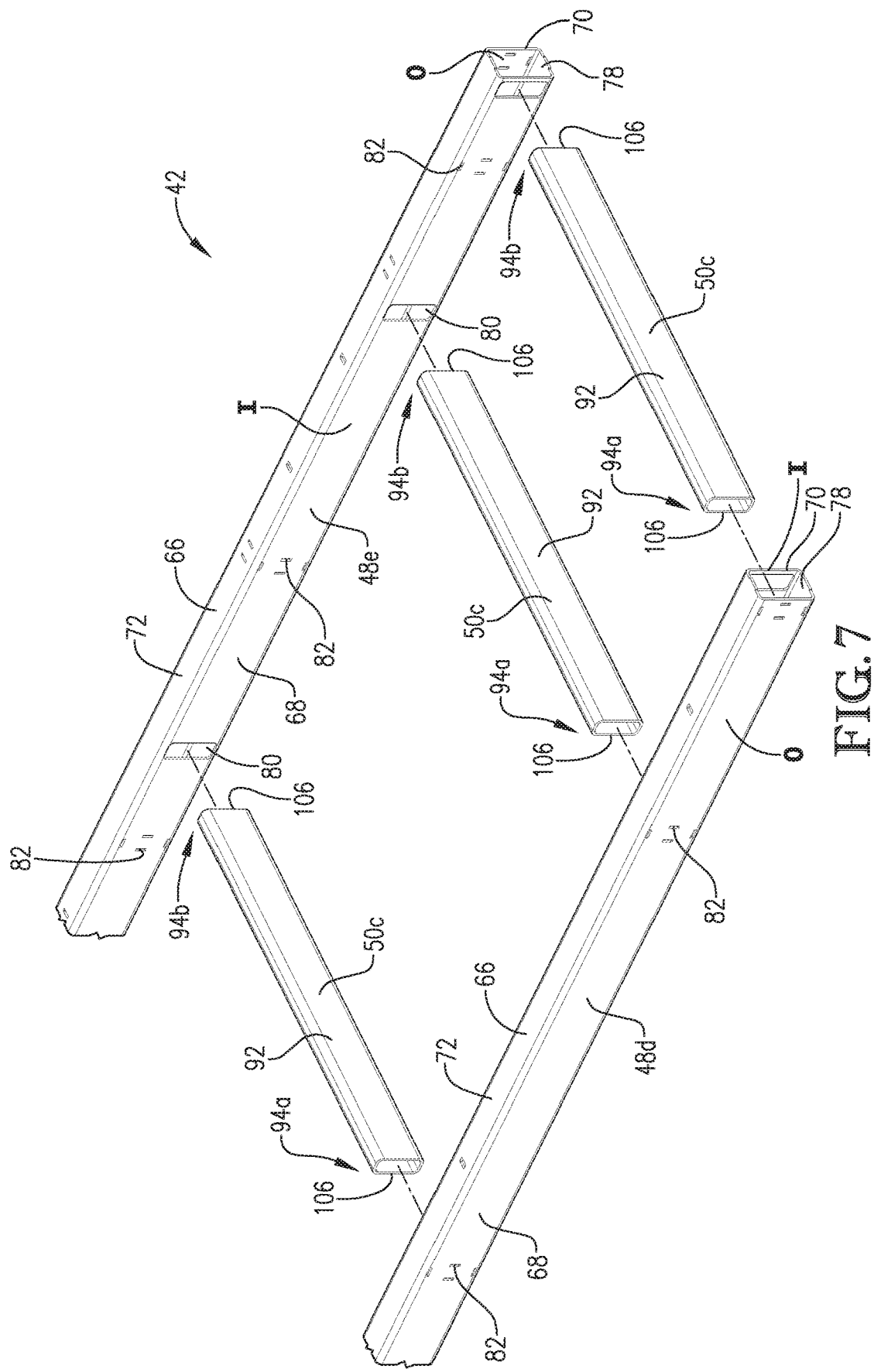
FIG. 7 is a fragmentary front perspective of the one wing subframe similar to FIG. 6, but showing the wing subframe exploded to illustrate how the frame members and interconnecting members are assembled at frame joints.

Corresponding ones of the upright walls 68, 70 of each frame member 48 preferably define a window opening 80 (see FIG. 7). Each frame member 48 also preferably defines slotted openings 82 located in upright walls 68, 70 that are opposite to respective window openings 80 at respective end frame joints 52 (see FIG. 7).

The depicted frame member 48b preferably defines a pair of window openings 80 that are opposite each other at a respective pass-through frame joint 54. As will be explained, the openings 80, 82 are configured to facilitate attachment of the frame members 48 to the interconnecting members 50 at respective frame joints 52, 54.

The window openings 80 of the frame members 48 and the respective interconnecting members 50 are complementally shaped. However, the window openings could be alternatively shaped and/or positioned without departing from the scope of the present invention. For instance, the window openings could be complementally shaped to conform to the profile of an alternative interconnecting member. As will be described in an alternative embodiment, the slotted openings could be alternatively shaped and/or positioned.

In the illustrated embodiment, each frame member 48 preferably serves as a toolbar. Furthermore, the frame members 48 define corresponding frame ranks 84, 86, 88 of the implement frame 32 for supporting the row units 38 (see FIGS. 2 and 3). It will be appreciated that the frame ranks 84, 86, 88 are cooperatively provided by the central subframe 40 and wing subframes 42. Also in the depicted embodiment, the inboard wheel subframe 44 provides another frame rank 90 (see FIG. 2).

However, it is also within the ambit of the present invention where one or more lateral frame members do not serve as a toolbar. For instance, the central and/or wing subframes could include one or more lateral frame members that do not support a row unit, a trip unit, or another structure supporting a ground-engaging tool.

The interconnecting members 50a, b, c each extend fore-and-aft between respective pairs of frame members 48. As will be discussed, the interconnecting member 50b also extends through the frame member 48b. The interconnecting members 50 each preferably comprise a unitary tubular beam 92 and present forward and aft ends 94a,b (see FIG. 7).

In particular, the interconnecting members 50 each preferably comprise a tubular beam 92 that extends continuously along its length. The beam 92 has a generally rectangular cross-sectional profile and includes upright side walls 96 that are connected by upper and lower walls 98, 100 (see FIG. 8). The upper and lower walls 98, 100 define an outer height dimension H2 (see FIG. 8). The walls 96, 98, 100 present an interior wall surface 102 and cooperatively define an interior beam space 104 (see FIG. 8).

The outer height dimension H2 presented by the tubular beam 92 is preferably less than the inner height dimension H1 of the tubular beam 66. However, the inner and outer height dimensions H1, H2 could be alternatively sized (e.g., where the height dimensions H1, H2 are substantially the same).

It is also within the ambit of the present invention where the tubular beams of the interconnecting members have an alternative cross-sectional profile. For instance, the tubular beams of the interconnecting members could have a circular, oval, square, or other polygonal profile. Also, the tubular beams of the interconnecting members could have cross-sectional profiles that are different from one another. In various alternative embodiments, the tubular beam of the interconnecting member could have a cross-sectional profile that is not continuous. For instance, one of the walls and/or portions of walls of the tubular beam could be removed without departing from the spirit of certain aspects of the present invention.

In alternative embodiments, it will also be appreciated that one or more of the interconnecting members could have various profile outline shapes that provide a solid beam configuration. That is, for some aspects of the present invention, one or more of the interconnecting members could have a beam configuration that is not tubular. For example, one or more interconnecting members could have a cross-sectional profile comprising a channel beam shape, an I-beam shape, or an H-beam shape.

Corresponding frame members 48 and interconnecting members 50 are joined to one another to provide the subframes 40, 42. In particular, the frame members 48 and interconnecting members 50 are joined to each other at the frame joints 52 and 54, as will be described further.

Turning to FIGS. 4-11, the depicted frame joints 52, 54 are configured to overcome various problems associated with conventional implement frame connections. For instance, the frame joints 52, 54 are designed to avoid fatigue crack formation due to cyclical tension and compression loads applied to the frame members 48, primarily due to advancement of the row units 38 through the ground.

The illustrated frame members 48 present window openings 80 and slotted openings 82 associated with the end frame joints 52. The frame member 48b also presents window openings 80 that are opposite each other and associated with the pass-through frame joint 54. The openings 80 are configured to facilitate attachment of the frame member 48b to the interconnecting member 50b at the frame joint 54.

Each interconnecting member 50a,c preferably has the ends 94a,b fixed to a corresponding pair of adjacent frame members 48 at end frame joints 52. The interconnecting members 50a,c are preferably laterally spaced apart from each other.

The window openings 80 and the tubular beam 92 of the interconnecting member 50b are complementally shaped. Thus, the interconnecting member 50b is slidably received by the respective window openings 80 prior to being fixed to the frame member 48b.

Preferably, the frame member 48b and interconnecting member 50b are connected to one another continuously around each of the window openings 80 to form the frame joint 54. More preferably, the frame member 48b and interconnecting member 50b are welded together endlessly along the window openings 80.

However, according t certain aspects of the present invention, the frame member 48b and interconnecting member 50b may be alternatively interconnected at the frame joint 54. For instance, the tubular beams could be welded together by one or more welds that do not extend endlessly along the window openings. Also, the tubular beams could be joined by a metal-fixing process other than welding, such as brazing.

The interconnecting member 50b also has the ends 94a,b fixed to a corresponding pair of frame members 48a,c at end frame joints 52. For the central subframe 40, the frame members 48a,c are associated with the frame ranks 84, 88. The interconnecting member 50b is also preferably attached to the frame member 48b. Because the frame member 48b is located intermediately between the frame members 48a,c, the interconnecting member 50b preferably passes through a pair of window openings 80 that are laterally aligned with each other and presented by the frame member 48b at the pass-through frame joint 54. Again, the interconnecting member 50b is preferably welded to the frame member 48b endlessly along the window openings 80.

The ends 94a,b of each interconnecting member 50 are secured so that the interconnecting members 50 extend through corresponding window openings 80 of inboard ones of the upright walls 68, 70, with the ends 94a,b being welded to outboard ones of the upright walls 68, 70. For instance, referring to FIGS. 7-9, the frame members 48d, 48e of wing subframe 42 are joined by interconnecting members 50c so that the frame members 48d, 48e provide inboard walls I and outboard walls O. In particular, the aft wall 70 of frame member 48d and the forward wall 68 of frame member 48e provide inboard walls I, while the forward wall 68 of frame member 48d and the aft wall 70 of frame member 48e provide outboard walls O (see FIGS. 7-9). Preferably, as shown in the depicted embodiment, the inboard walls I present respective window openings 80, and the outboard walls O present respective slotted openings 82.

To the extent that certain frame members 48 (such as frame member 48e) include an upright wall with both window openings 80 and slotted openings 82, that upright wall serves as both an inboard wall I and an outboard wall O. For instance, the forward and aft walls 68, 70 of the frame member 48e each present both window openings 80 and slotted openings 82 (see FIGS. 7 and 9). It will be appreciated that the forward and aft walls 68, 70 of frame member 48e each have openings 80, 82 because the frame member 48e is interconnected with frame members 48d, 48f that are positioned to the front and back thereof. Thus, the forward and aft walls 68, 70 of the frame member 48e each serve as both an inboard wall and an outboard wall.

Although interconnecting member 50b passes through a single intermediate frame member 48b, it is also within the scope of the present invention where an interconnecting member passes through two or more frame members.

The window openings 80 of the frame members 48 and the respective tubular beams 92 of the interconnecting members 50 are complementally shaped. Each tubular beam 92 is slidably received by the respective window opening 80 prior to being fixed to the corresponding frame members 48.

The tubular beams 66 of the frame members 48 receive respective ends 94a,b of the interconnecting members 50 so that the interconnecting members 50 extend into and out of the interior beam spaces 78 through the window openings 80.

Preferably, the tubular beams 66, 92 are connected to one another continuously around each of the window openings 80. More preferably, the tubular beams 66, 92 are welded together endlessly along the window openings 80 with an endless bead of weld material 105 (see FIG. 11).

However, according to certain aspects of the present invention, the tubular beams 66, 92 may be alternatively interconnected. For instance, the tubular beams 66, 92 could be welded together by one or more welds that do not extend endlessly along the window opening. Also, the tubular beams 66, 92 could be joined by a metal-fixing process other than welding, such as brazing.

Figure 8:
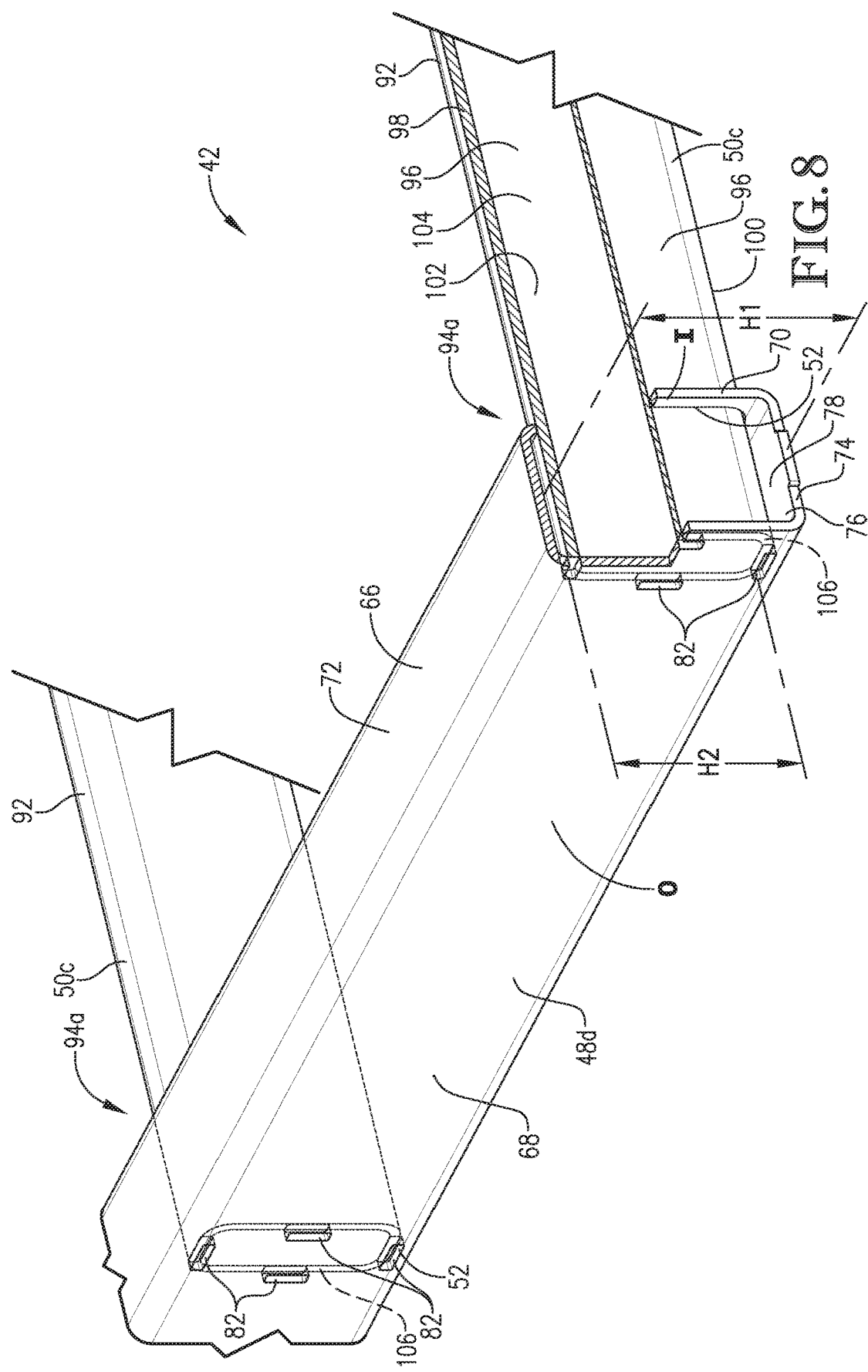
FIG. 8 is an enlarged fragmentary front perspective of the one wing subframe similar to FIG. 6, but showing the wing subframe cross sectioned to illustrate the frame joint configuration.
Figure 9:
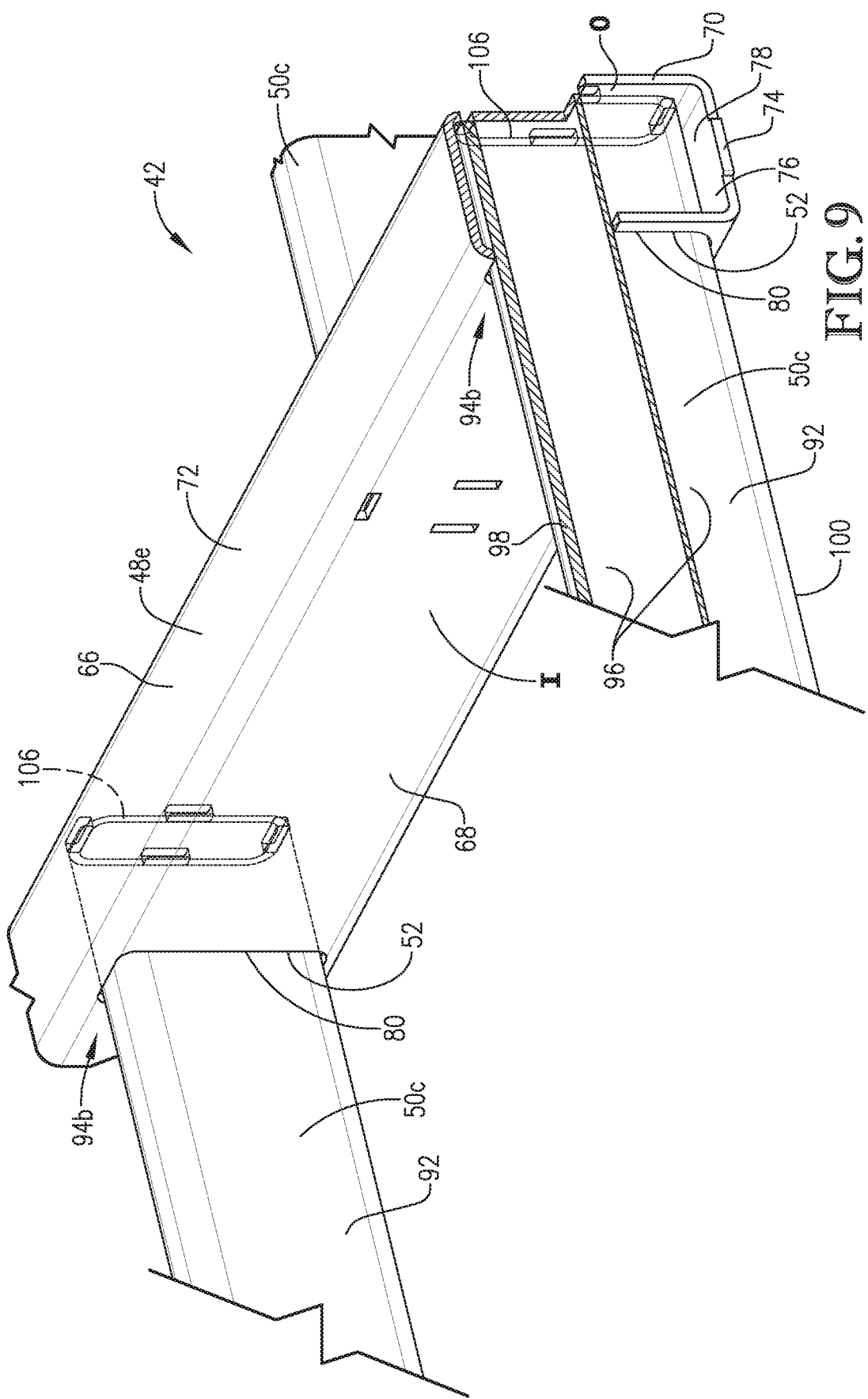
FIG. 9 is an enlarged fragmentary front perspective of a portion of the one wing subframe shown in FIG. 6, but depicting the wing subframe cross sectioned to illustrate the frame joint configuration.
Figure 10:
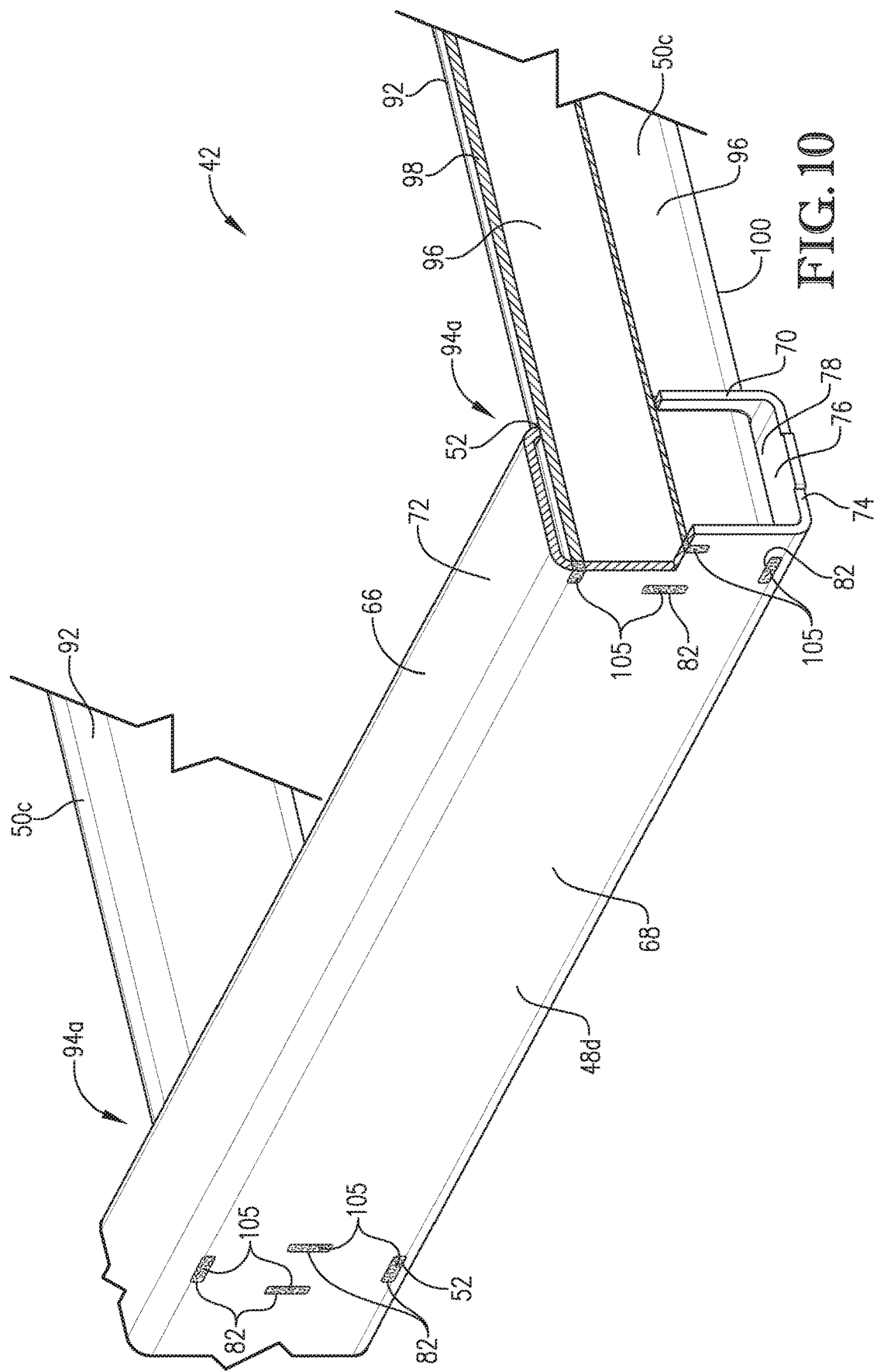
FIG. 10 is an enlarged fragmentary front perspective of a portion of the one wing subframe shown in FIG. 8, but depicting weld material applied within slotted openings to fix the ends of the interconnecting members to the respective frame member.
Figure 11:
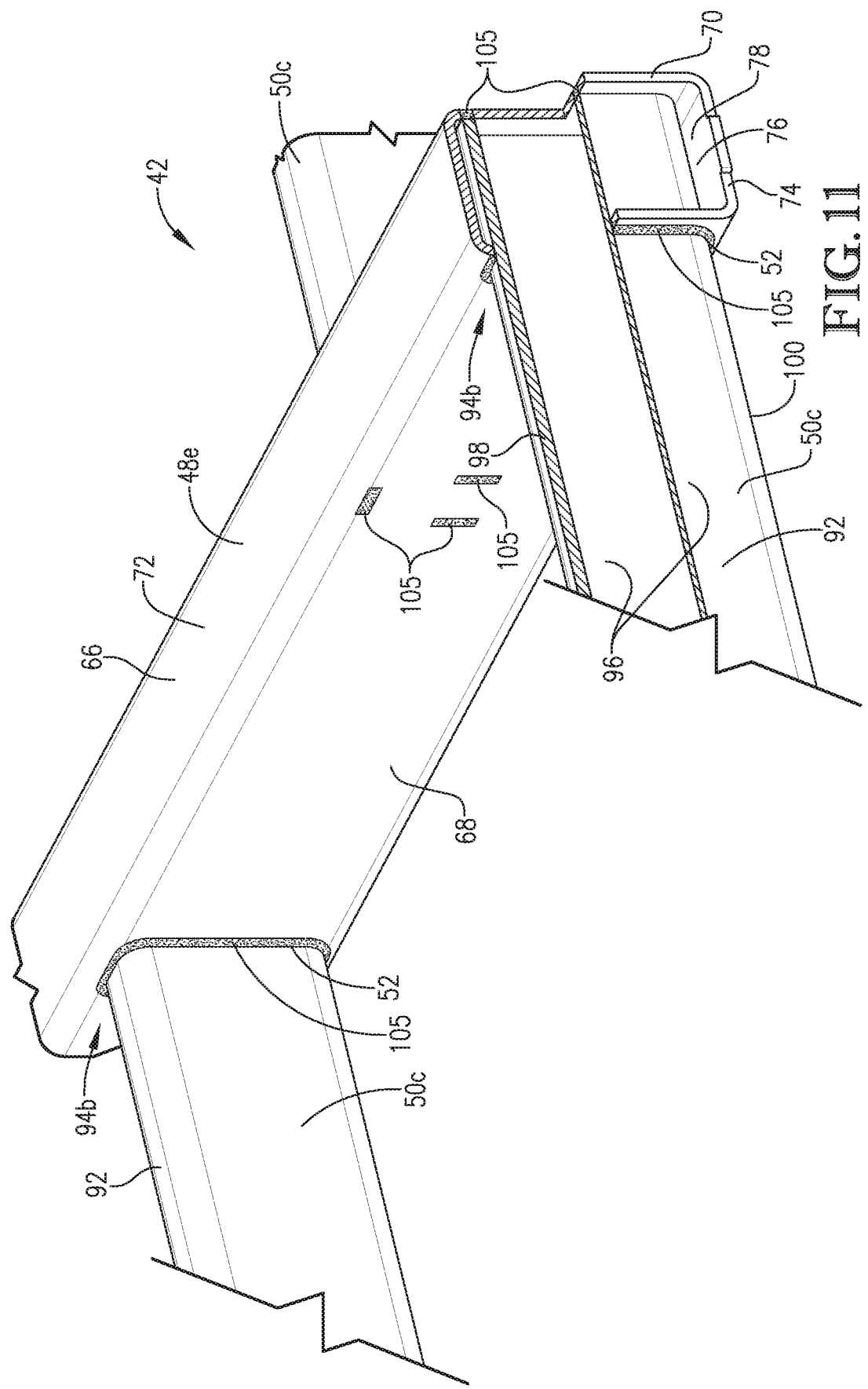
FIG. 11 is an enlarged fragmentary front perspective of a portion of the one wing subframe shown in FIG. 9, but depicting weld material applied about the window openings to fix the interconnecting members to the respective frame member.

Each end of the tubular beam 92 presents an end surface 106 that conforms to the interior wall surface 76 of the respective tubular beam 66 (see FIGS. 7-9). It is also within the scope of the present invention where the end surfaces 106 are alternatively shaped. For instance, as will be shown in a subsequent embodiment, the ends could include tabs that are configured for positioning in slotted openings of the frame members. Furthermore, according to certain aspects of the present invention, portions of the end surface may be spaced from the interior wall surface.

The slotted openings 82 associated with each end frame joint 52 are preferably spaced apart and located adjacent the corresponding end of the tubular beam 92. Preferably, the ends 94*a,b* of the tubular beam 92 are welded to the corresponding upright walls 68, 70 along the slotted openings 82 of the respective tubular beam 66. In the depicted embodiment, the slotted openings 82 are configured to receive corresponding beads of weld material 105 that join the tubular beams 66, 92 to one another at the respective end frame joint 52 (see FIGS. 10 and 11).

The depicted interconnecting members 50 are preferably laterally spaced apart from one another. For instance, each interconnecting member 50*a,c* fixed to a corresponding pair of adjacent frame members 48 associated with the first and second frame ranks 84, 86 are preferably laterally offset from each interconnecting member 50*a,c* fixed to a corresponding pair of adjacent frame members 48 associated with the second and third frame ranks 86, 88 (see FIG. 3). In this manner, the frame joints 52, 54 along the second frame rank 86 are preferably spaced apart to facilitate assembly of those frame joints 52, 54. However, for some aspects of the present invention, one or more interconnecting members 50*a,c* could be at least partly laterally overlapping or otherwise aligned with one another.

Turning to FIGS. 12 and 13, an alternative frame member 107 and an alternative interconnecting member 108 are configured to provide an alternative end frame joint 52*a*. The frame member 107 presents a window opening 80 and alternative slotted openings 107*a*. The interconnecting member 108 includes tabs 108*a* associated with an end 108*b* of the member 108.

When assembled, the interconnecting member 108 extends through the window opening 80, and the tabs 108*a* are positioned in the slotted openings 107*a*. The members 107, 108 are welded to one another by applying weld material 109 within the slotted openings 107*a* and along the tabs 108*a*.

Row Unit and Mounting Device

Turning to FIGS. 2, 3, and 14-21, each row unit 38 preferably comprises an opener and is configured to dispense seed and/or fertilizer in a furrow (not shown) while being advanced. As is customary, the row units 38 are preferably advanced by being towed behind an agricultural vehicle (not shown). In the usual manner, the row units 38 are operable to open the furrow (not shown) and deposit seed (not shown) and/or fertilizer (not shown) therein.

Again, the principles of the present invention are also applicable where the implement 30 includes one or more tool units other than the depicted row units 38. For instance, the implement 30 could include one or more resetting trip units that support a unit tool, such as an agricultural disc or shank, that is configured to engage the ground while being advanced. In various embodiments, one or more tool units could comprise a rotary harrow, a vertical harrow, a disc coulter, a tandem disc roller, a packing gang, etc.

Multiple row units 20 are preferably provided as part of the implement 30 (see FIGS. 2, 3, and 14). The implement 30 also includes a hydraulic system (not shown) to shift the row units 38 vertically. The hydraulic system preferably includes, among other things, hydraulic lines (not shown) that deliver hydraulic fluid to the row units 38.

Each row unit 38 preferably includes a mounting device 110, an actuator 112, a dispensing assembly 114, a suspension 116, and a gauge wheel 118 (see FIGS. 14-16). Each mounting device 110 serves to mount a corresponding row unit 38 to a corresponding frame member 48, as will be described in greater detail.

Turning to FIGS. 14-16, the suspension 116 is configured to shift with the dispensing assembly 114 vertically so that the row unit 38 can be moved between a raised transport position (see FIGS. 15 and 16) and a lowered operating position (see FIG. 14). More specifically, the actuator 112 is operably connected to the suspension 116 to drive the dispensing assembly 114 and the suspension 116 between the positions.

In the depicted embodiment, the suspension 116 preferably includes a linkage 120, a shank support arm 122, a suspension arm 124, and a trailing arm 126. The mounting device 110 preferably supports the suspension 116 in a location generally below the frame member 48. As will be described, the mounting device 110 can be loosened or detached from the frame member 48 to move the row unit 38 to another location on the frame member 48 (or to a location on another frame member 48).

The illustrated linkage 120 includes upper and lower links 128, 130. The linkage 120, suspension arm 124, and mounting device 110 cooperatively form a parallel, four-bar linkage assembly 132.

While the illustrated four-bar linkage assembly 132 is preferred to support other components of the row unit 38 in the transport and operating positions, the row unit 38 could have an alternative support structure. For instance, the suspension 116 could have an alternative linkage to interconnect the device 110 and the suspension arm 124 and permit vertical shifting movement of the suspension arm 124. It will also be appreciated that the suspension arm 124 could be alternatively configured or wholly eliminated without departing from certain aspects of the present invention.

The actuator 112 preferably comprises a conventional hydraulic cylinder with a cylinder body 134 and a piston 136 (see FIG. 16). As is customary, the piston 136 is slidable inwardly relative to the body 134 to retract the actuator 112 and is slidable outwardly relative to the body 134 to extend the actuator 112. The actuator 112 is fluidly connected to the hydraulic system of the implement 30 via hydraulic lines (not shown). Thus, the actuator 112 fluidly communicates with the hydraulic system so that the actuator 112 can be selectively extended and retracted.

The actuator 112 is preferably mounted to drive the linkage assembly 132 between the transport and operating positions. The actuator 112 is mounted by pivotally attaching the piston 136 to the mounting device 110 at an upper bracket pivot joint 138 and by pivotally attaching the body 134 to the support arm 122 at a cylinder pivot joint 140 (see FIGS. 14-16). Of course, the orientation of this cylinder attachment may be reversed if desired.

The shank support arm 122 is pivotally mounted to the suspension arm 124 and the lower link 130 at a lower suspension arm pivot joint 142. The support arm 122 is attached to the trailing arm 126 and contacts a gauge adjustment wheel 144. The wheel 144 includes a cam 146 that engages the support arm 122 and is rotatably supported by the suspension arm 124 to adjust the depth of the row unit 38 in the operating position (see FIG. 16).

Additional preferred details of the row unit 38, such as the dispensing assembly 114, are disclosed in nonprovisional application Ser. No. 16/238,287, filed Jan. 2, 2019, entitled SOIL OPENER WITH COMPOUND CARBIDE PROTECTION, which is hereby incorporated in its entirety by reference herein.

Turning to FIGS. 15-21, the mounting devices 110 are configured to support the row unit 38 and adjustably attach the row unit 38 to a corresponding one of the frame members 48. In supporting the row unit 38, the mounting device 110 is configured to support the respective row unit 38 during operation, in which the row unit 38 is exposed to external forces, such as lateral and vertical forces F1, F2, associated with advancing the row unit 38 along the ground (see FIG. 14). As a result of the forces F1, F2, the row unit 38 generally applies a torsional force M to the frame member 48 via the mounting device 110 (see FIG. 14). The torsional force M is transmitted to the frame member 48 and produces corresponding tensile forces T and compression forces C applied to the interconnecting members 50 (see FIG. 14). The mounting devices 110 are configured to cooperate with the implement frame 32 to transmit the torsional force M while resisting failure.

Each mounting device 110 preferably includes a mounting bracket 150, a cam element shifter 152, driving cam elements 154, and a driven cam element 156. As will be further discussed, the mounting device 110 also presents a device opening 158 configured to receive the frame member 48.

It will be understood that the mounting device 110 is also operable to support various types of tool units, other than the depicted row unit 38, and to support torsional forces applied by such tool units. For instance, the mounting device 110 is operable to support a resetting trip unit that supports a unit tool, such as an agricultural disc or shank, where the unit tool is configured to engage the ground while being advanced. In various embodiments, the mounting device 110 could be configured to support tool units such as a rotary harrow, a vertical harrow, a disc coulter, a tandem disc roller, a packing gang, etc.

The mounting bracket 150 provides a relatively rigid and robust bracket structure that is configured to transmit the applied force M while supporting the rest of the row unit 38. The mounting bracket 150 preferably includes a pair of linkage support plates 160, a base 162, and a pair of opposed mounting arms 164.

The linkage support plates 160 and base 162 cooperatively provide a structure to shiftably support the links 128, 130. The plates 160 and base 162 each preferably comprise a unitary construction. The plates 160 are preferably welded to the base 162, but could be fixed by another means, such as brazing. Furthermore, it will be understood that the bracket could be alternatively formed, such as being die cast, within the spirit of the present invention. As will be appreciated, the base 160 defines a corresponding part of the device opening 158.

The plates 160 are pivotally attached to the links 128, 130 to provide the upper pivot joint 138 and a lower pivot joint 166 (see FIGS. 15, 16, and 19). In particular, the plates 160 are attached to the links 128, 130 by pins 168 that extend through the links 128, 130 and corresponding openings 170 in the plates 160 (see FIGS. 17-19).

The base 160 includes upright tabs 172 that are positioned adjacent to respective mounting arms 164 (see FIG. 17). The tabs 172 are configured to locate the frame member 48 within the device opening 158.

The plates 160 and base 162 are preferably formed of high-strength steel, but could include, additionally or alternatively, one or more other materials, such as an alternative metallic material (e.g., an alternative steel or metal alloy).

Turning to FIGS. 17-21, the mounting arms 164 are configured to engage the frame member 48 while supporting the shifter 152 and cam elements 154, 156. The mounting arms 164 each preferably comprise a unitary plate construction and define respective parts of the device opening 158.

The mounting arms 164 preferably present pairs of opposed openings 173. As will be discussed, each pair of openings 173 is configured to removably receive the shifter 152.

One of the mounting arms 164 also preferably presents shoulders 174 associated with each pair of openings 173 (see FIG. 18). Each shoulder 174 is configured to engage a fastener head of the shifter 152. In particular, the shoulder 174 is configured to restrict rotation of the fastener bolt as the fastener nut is threaded along the bolt.

The mounting arms 164 are preferably fixed to the plates 160 and base 162, with upper sections of the mounting arms 164 extending above the base 162. The upper sections of the mounting arms 164 are configured to yieldably flex as the mounting device 110 is adjustably secured.

The mounting arms 164 are also preferably formed of high-strength steel, but could include, additionally or alternatively, one or more other materials, such as an alternative metallic material (e.g., an alternative steel or metal alloy).

The cam element shifter 152 preferably comprises a fastener 176 operable to selectively impart relative shifting of the cam elements 154, 156 in a first direction D1 (see FIGS. 20 and 21). As will be discussed, the fastener preferably extends between the mounting arms 164 to support the cam elements 154, 156 in a position between the mounting arms 164.

The depicted fastener 176 preferably comprises a threaded fastener with a fastener axis A (see FIG. 20) and includes a threaded bolt 176a and a complemental threaded nut 176b. The threaded bolt 176a includes a hex-shaped fastener head 176c, while the nut 176b is also hex-shaped. The bolt 176a and nut 176b are complementally engaged to interconnect the mounting arms 164.

The depicted fastener 176 is preferably arranged so that the fastener axis A is generally parallel to the first direction D1. However, for certain aspects of the present invention, the fastener could be arranged in an off-axis relationship to the first direction D1.

As the nut 176b is threaded onto the bolt 176a, the nut 176b and the bolt 176a are tightened to engage the mounting arms 164 and shift the mounting arms 164 toward one another. For instance, the fastener 176 is tightened to shift the mounting arms 164 from a relaxed, unflexed position (see FIGS. 19 and 20) to a flexed position (see FIG. 21). In the depicted embodiment, as the mounting arms 164 are shifted toward each other, the mounting arms 164 preferably move the driving cam elements 154 toward each other.

As the nut is threaded in the opposite direction along the fastener axis A, associated with threading the nut 176b off of the bolt 176a, the nut 176b and bolt 176a are loosened to permit the mounting arms 164 to shift away from each other. For example, the fastener 176 is loosened to permit shifting of the mounting arms 164 from the flexed position (see FIG. 21) to the unflexed position (see FIGS. 19 and 20). Because the mounting arms 164 are yieldably flexed and under stress in the flexed position, the mounting arms 164 generally return themselves out of the flexed position and toward the unflexed position as the fastener 176 is loosened. It will also be appreciated that the fastener could be alternatively constructed to drive the mounting arms 164 from the flexed position to the unflexed position.

Although the cam element shifter 152 preferably includes the depicted fastener 176, the mounting device could have an alternative cam element shifter arrangement without departing from the scope of the present invention.

For example, rather than including threaded fastener elements, the cam element shifter could include ratchet-type elements to incrementally (i.e., gradually) shift cam elements toward and/or away from each other.

The cam element shifter could also include a powered drive motor, such as a linear motor (e.g., an electric or hydraulic linear motor) to gradually shift cam elements toward and/or away from each other.

The fastener 176 and arms 164 cooperatively present a clamping device that adjustably engages the cam elements 154, 156. Again, the fastener 176 is operable to move the mounting arms 164 toward each other along the first direction D1 to impart relative shifting of the cam elements 154, 156. In this manner, the fastener 176 also preferably shifts the mounting arms 164 into frictional clamping engagement with the respective frame member 48 (see FIG. 21).

However, the fastener could alternatively be configured to engage the cam elements directly. For instance, the shifter could itself comprise a clamp device with clamp surfaces that directly contact the driving cam elements.

Referring again to FIGS. 17-21, the depicted mounting device 110 preferably has a pair of driving cam elements 154. The illustrated driving cam elements 154 each have a generally tubular structure that enables the cam elements to be operably supported as part of the mounting device 110. In particular, the driving cam elements 154 each present a bore 154*a* that slidably receives the fastener 176 to permit cam element movement along the first direction D1. As will be discussed, the cam elements 154 are movable toward each other by the shifter 152 (and arms 164) to move the driven cam element in a transverse second direction D2.

In the depicted embodiment, each driving cam element 154 has a bore 154*a* that is preferably sized to snugly receive the fastener 176 so that minimal off-axis shifting of the driving cam elements 154 relative to fastener 176 is permitted. That is, the driving cam elements 154 and the fastener 176 cooperatively permit each driving cam element 154 to slide along the fastener axis A while restricting the driving cam elements 154 from moving transverse to the fastener axis A.

The driving cam elements 154 preferably present respective driving cam surfaces 154*b*. The illustrated driving cam surfaces 154*b* are generally planar and configured to engage corresponding surfaces of the driven cam element 156, as will be discussed.

The driving cam elements 154 also preferably present corresponding surface portions 154*c* that are generally planar and define respective parts of the device opening 158. The surface portions 154*c* extend along the first direction D1. More preferably, the surface portions 154*c* are generally parallel to one another.

The depicted cam elements 154 have a generally rectangular cross-sectional profile. However, one or both of the cam elements could have an alternatively shaped profile (e.g., circular, oval, square, or another polygonal shape).

The driving cam elements 154 preferably have a tubular construction for being shiftably supported by the fastener 176. However, the driving cam elements 154 could have a non-tubular configuration while being shiftably supported. For instance, the driving cam elements could have a slotted opening to permit sliding movement of the driving cam elements along the first direction D1.

The driving cam elements 154 are also preferably formed of high-strength steel, but may include, additionally or alternatively, one or more other materials, such as an alternative metallic material (e.g., iron, an alternative steel, or another metal alloy).

The driving cam elements 154 are preferably arranged so that the driven cam element 156 is positioned therebetween. As noted, the driving cam elements 154 are positioned to define respective parts of the device opening 158. However, the mounting device 110 could be constructed so that the driving cam elements 154 define a different part of the device opening or form no part of the device opening (e.g., where the driven cam element spans the entire width of the device opening).

It is also within the ambit of the present invention where the mounting device has an alternative number of driving cam elements. For instance, the mounting device could have a single driving cam element or more than two driving cam elements.

The driving cam elements could be alternatively supported without departing from the scope of the present invention. For instance, the driving cam elements could be shiftably mounted on a cam element shifter other than the fastener. The cam elements could also be shiftably supported relative to the cam element shifter. For example, the driving cam elements could be slidably mounted on a rail-type support separate from the fastener. Also, one or both of the driving cam elements could be attached directly to respective mounting arms. Furthermore, one or both of the driving cam elements could be integrally provided as part of the mounting arms.

Again, the driving cam elements 154 are preferably engaged by corresponding mounting arms 164, particularly as the mounting arms 164 are moved toward each other by the shifter 152. When the fastener 176 is tightened to shift the mounting arms 164 from the relaxed, unflexed position (see FIGS. 19 and 20) to the flexed position (see FIG. 21), the mounting arms 164 move the driving cam elements 154 toward each other.

However, the driving cam elements could be alternatively engaged and/or driven to shift the driven cam element. For instance, the driving cam elements could be engaged directly by a cam element shifter (e.g., a shifter similar to the depicted fastener).

It is also within the scope of the present invention where the cam element shifter is a different or separate from a device used to move the mounting arms toward each other.

The illustrated driven cam element 156 also preferably has a generally tubular structure that enables the cam element 156 to be operably supported as part of the mounting device 110. The driven cam element 156 presents a bore 156*a* that slidably receives the fastener 176 to permit cam element movement along the first direction D1.

In the depicted embodiment, the driven cam element 156 has a bore 156*a* that is preferably oversized relative to the fastener 176 to loosely receive the fastener 176. In this manner, the driven cam element 156 and fastener 176 cooperatively permit some off-axis shifting of the driven cam element 156 relative to fastener 176. For instance, the driven cam element 156 and the fastener 176 cooperatively permit the driven cam element 156 to slide along the fastener axis A while also permitting the driven cam element 154 to shift transversely to the fastener axis A. Thus, in the illustrated embodiment, the driven cam element 156 and the fastener 176 cooperatively permit the driven cam element 156 to move along the first direction D1 and the second direction D1. Consequently, the driven cam element 156 can move along the second direction D1 to facilitate gripping engagement with the frame member 48.

The driven cam element 156 also presents driven cam surfaces 156*b*. The driven cam surfaces 156*b* are slidably engaged and complementally shaped with respect to corresponding ones of the driving cam surfaces 154b to define respective cam interfaces 178 (see FIGS. 20 and 21).

The illustrated driven cam surfaces 156b are generally planar and configured to engage the planar driving cam surfaces 154b. It will be appreciated that, according to certain aspects of the present invention, the cam surfaces 154b, 156b may alternatively be configured to have non-planar complemental cam surface shapes.

The depicted cam element 156 also has a generally rectangular cross-sectional profile. However, in accordance with certain aspects of the present invention, the driven cam element may have an alternatively shaped profile (e.g., circular, oval, square, or another polygonal shape).

The driven cam element 156 preferably has a tubular construction for being shiftably supported by the fastener 176. However, the cam element 156 may have a non-tubular configuration while being shiftably supported. For instance, the driven cam element could have a slotted opening to be slidably mounted on a rail-type support to permit movement of the cam element along the first direction D1 and the second direction D2. Furthermore, it will be understood that a non-tubular driven cam element may alternatively be supported in various other ways. For instance, the driven cam element could be held in place between the driving cam elements and the frame member and, thereby, loosely fitted as part of the bracket device.

The driven cam element 156 is also preferably formed of high-strength steel, but may include, additionally or alternatively, one or more other materials, such as an alternative metallic material (e.g., iron, an alternative steel, or another metal alloy).

Each cam interface 178 extends transversely to the first direction D1 such that the driven cam element 156 is moved in the transverse second direction D2 when the driving cam elements 154 are relatively shifted by the cam element shifter 152. Preferably, each cam interface 178 extends at an included angle θ to the first direction D1 (see FIG. 21). The included angle θ is preferably oblique and, more preferably, the included angle θ is about forty-five degrees)(45°. However, the cam interface may alternatively be configured to provide suitable cam operation.

The driven cam element 156 is configured to adjustably engage the frame member 48 when moving in the second direction D2. In particular, the driven cam element 156 presents a surface portion 156c to engage the frame member 48. The depicted surface portion 156c is generally planar and defines at least part of the device opening 158. The surface portion 156c preferably extends along the first direction D1. More preferably, the surface portion 156c is generally parallel to the surface portions 154c of the driving cam elements 154.

For certain aspects of the present invention, the surface portions 154c, 156c could be differently shaped. At least the surface portion 156c preferably conforms to the shape of the top wall of the frame member 48 to provide gripping engagement with the frame member 48.

In the illustrated embodiment, when the mounting device 110 is mounted to the frame member 48 in the unflexed position (see FIGS. 19 and 20), the driven cam element 156 is positioned on the fastener 176 and adjacent the frame member 48 so as to apply little or no clamping force to the frame member 48 (see FIG. 20). However, in accordance with certain aspects of the present invention, the driven cam element 156 may alternatively at least partly engage the frame member 48 in the unflexed position, such that the driven cam element 156 applies some clamping force to the frame member 48.

Again, the fastener 176 can be tightened to shift the mounting arms 164 from the relaxed, unflexed position (see FIGS. 19 and 20) to the flexed position (see FIG. 21) and thereby secure the mounting device 110 on the frame member 48. In the depicted embodiment, such tightening of the fastener 176 causes the mounting arms 164 to move the driving cam elements 154 toward each other along the first direction D1, which causes corresponding movement of the driven cam element 156 along the second direction D2 (see FIGS. 20 and 21). Thus, as the mounting arms 164 are shifted into the flexed position, the driven cam element 156 is shifted toward and into clamping engagement with the frame member 48.

To the extent that the driven cam element 156 is alternatively configured to engage the frame member 48 in the unflexed position and apply a clamping force, it will be understood that tightening of the fastener 176 is also operable urge the driven cam element 156 into further clamping engagement with the frame member 48 such that the driven cam element applies a relatively greater clamping force to the frame member 48.

When the mounting device 110 (and the corresponding row unit 38) are secured on the frame member 48, the fastener 176 may be selectively loosened to return the mounting device 110 to the unflexed position. In the unflexed position, the mounting device 110 is mounted on the frame member 48 so as to permit limited movement of the mounting device 110 along the frame member 48. The mounting device 110 may be removed from the frame member 48 by detaching the fastener 176 and cam elements 154, 156 from the mounting bracket 150.

In use, the mounting device 110 is removably and adjustably secured to the frame member 48 in order to secure the row unit 38 to the frame member 48. The mounting device 110 is secured by positioning the frame member 48 between the mounting arms 164 of the mounting bracket 150 and adjacent to the base 162. The cam elements 154, 156 may then be positioned between the mounting arms 164 in alignment with one another and with a corresponding pair of openings 173 (see FIGS. 20 and 21). In particular, the cam elements 154, 156 are positioned so that the bores 154a, 156a are approximately aligned with each other and with the pair of openings 173 to permit insertion of the fastener 176 through the bores 154a, 156a and the openings 173.

With the fastener 173 inserted through the mounting arms 164 and cam elements 154, 156, the mounting device 110 may be mounted on the frame member 48 in the unflexed position (see FIG. 20). In this position, the mounting device 110 supports the row unit 38 on the frame member 48 while permitting limited movement of the row unit 38 along the frame member 48.

The fastener 173 is selectively tightenable into the flexed position to rigidly secure the row unit 38 on the frame member 48. Again, tightening of the fastener 176 causes the mounting arms 164 to move the driving cam elements 154 toward each other along the first direction D1, which causes corresponding movement of the driven cam element 156 along the second direction D2 (see FIGS. 20 and 21). As the mounting arms 164 are shifted into the flexed position, the driven cam element 156 is shifted toward and into clamping engagement with the frame member 48 to secure the row unit 38.

The row unit 38 may be selectively repositioned along the frame member 48 by loosening the fastener 173 and returning the mounting device 110 to the unflexed position. Furthermore, the row unit 38 can be selectively removed from the frame member 48 by detaching the fastener 176 and cam elements 154, 156 from the mounting bracket 150.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An agricultural implement configured to be advanced in a forward direction, said implement comprising:
    an implement frame including a pair of laterally extending fore-and-aft spaced frame members,
    said frame including a fore-and-aft extending interconnecting member that extends between the frame members and presents forward and aft ends,
    at least one of said frame members comprising a tubular beam presenting forward and aft walls,
    said forward and aft walls at least partly defining an interior beam space, with a window opening being defined in a first one of the walls,
    a second one of the walls presenting an interior wall surface that partly defines the interior beam space,
    said tubular beam receiving a respective end of the interconnecting member so that the interconnecting member extends into and out of the interior beam space through the window opening,
    said respective end of the interconnecting member abutting the interior wall surface without extending beyond a second one of the walls,
    said respective end of the interconnecting member being welded to the second one of the walls.

2. The agricultural implement as claimed in claim 1,
    said window opening and said interconnecting member being complementally shaped, with the interconnecting member being slidably received by the window opening.

3. The agricultural implement as claimed in claim 2,
    said tubular beam and said interconnecting member being welded to each other along the window opening in the first one of the walls.

4. The agricultural implement as claimed in claim 2,
    said tubular beam and said interconnecting member being connected to one another continuously around the window opening in the first one of the walls.

5. The agricultural implement as claimed in claim 4,
    said tubular beam and said interconnecting member being welded together endlessly along the window opening.

6. The agricultural implement as claimed in claim 2, said interconnecting member being tubular,
    said tubular beam and said interconnecting member each having a generally polygonal cross-sectional profile.

7. The agricultural implement as claimed in claim 2,
    said interconnecting member presenting a height dimension less than that of the tubular beam.

8. The agricultural implement as claimed in claim 1,
    said respective end of the interconnecting member presenting an end surface that conforms at least in part to the interior wall surface.

9. The agricultural implement as claimed in claim 1,
    said second one of the walls presenting a slotted opening located adjacent the respective end of the interconnecting member,
    said respective end of the interconnecting member and the second one of the walls being welded to each other along the slotted opening.

10. The agricultural implement as claimed in claim 9,
    said respective end of the interconnecting member being located outside of the slotted opening.

11. The agricultural implement as claimed in claim 9,
    said respective end of the interconnecting member including a tab located in the slotted opening and welded to the other wall.

12. The agricultural implement as claimed in claim 1,
    each of said frame members comprising the tubular beam with the forward and aft walls and the interior beam space, and the window openings being defined in oppositely facing inboard ones of the walls,
    said inboard ones of the walls including the aft wall of a fore one of the frame members and in the forward wall of an aft one of the frame members,
    said frame members receiving respective ends of the interconnecting member so that the interconnecting member extends into and out of the interior beam spaces through the corresponding window openings.

13. The agricultural implement as claimed in claim 12,
    said respective ends of the interconnecting member being welded to outboard ones of the walls.

14. The agricultural implement as claimed in claim 13,
    said outboard walls each presenting a slotted opening located adjacent the respective ends of the interconnecting member,
    said respective ends of the interconnecting member and the outboard walls being welded to each other along the respective slotted openings.

15. The agricultural implement as claimed in claim 12,
    said implement frame including an intermediate frame member positioned in a fore-and-aft direction between the pair of frame members and coupled to the interconnecting member.

16. The agricultural implement as claimed in claim 15,
    said intermediate frame member comprising an intermediate tubular beam presenting fore and rear walls,
    said fore and rear walls defining respective intermediate window openings that are laterally aligned, with the interconnecting member projecting through the intermediate frame member by passing through the intermediate window openings.

17. The agricultural implement as claimed in claim 16,
    said intermediate tubular beam and said interconnecting member being connected to one another continuously around the intermediate window openings.

18. The agricultural implement as claimed in claim 17, said intermediate tubular beam and said interconnecting member being welded together endlessly along the intermediate window openings.

19. The agricultural implement as claimed in claim 1, said at least one frame member comprising a toolbar; and a ground-engaging unit supported by the toolbar while being advanced in the forward direction.

* * * * *